United States Patent
Dyer et al.

(10) Patent No.: US 11,898,385 B2
(45) Date of Patent: Feb. 13, 2024

(54) DEVICE AND PROCESS TO DAMPEN VIBRATION IN MULTI-ROD CONFIGURATIONS

(71) Applicant: MarathonNorco Aerospace, Inc., Waco, TX (US)

(72) Inventors: Benjamin Dyer, Waco, TX (US); Garrett Wise, Waco, TX (US)

(73) Assignee: MARATHONNORCO AEROSPACE, INC., Waco, TX (US)

(*) Notice: Subject to any disclaimer, the term of this patent is extended or adjusted under 35 U.S.C. 154(b) by 524 days.

(21) Appl. No.: 16/787,444

(22) Filed: Feb. 11, 2020

(65) Prior Publication Data

US 2020/0256098 A1 Aug. 13, 2020

Related U.S. Application Data

(60) Provisional application No. 62/803,760, filed on Feb. 11, 2019.

(51) Int. Cl.
*E05C 17/30* (2006.01)
*E05C 17/12* (2006.01)
*F16F 7/09* (2006.01)

(52) U.S. Cl.
CPC ............. *E05C 17/30* (2013.01); *E05C 17/12* (2013.01); *F16F 7/09* (2013.01); *E05Y 2900/502* (2013.01); *E05Y 2900/531* (2013.01)

(58) Field of Classification Search
CPC ....... Y10T 403/32501; Y10T 403/7009; Y10T 403/7051; Y10T 403/7077; Y10T 16/61; Y10T 292/301; E05C 17/30; E05C 17/12; F16B 7/1445; F16F 1/025; F16F 7/09

USPC ......... 16/71, 72, 82, 83, 84, 85, 86 R, 86 A, 16/86 B

See application file for complete search history.

(56) References Cited

U.S. PATENT DOCUMENTS

| | | | |
|---|---|---|---|
| 1,794,265 A | | 2/1931 | Wesner et al. |
| 2,237,318 A | * | 4/1941 | Snyder ...................... F16F 7/09 |
| | | | 188/129 |
| 2,429,140 A | * | 10/1947 | Snyder ...................... F16F 7/09 |
| | | | 267/209 |
| 3,711,892 A | * | 1/1973 | Tabor .................... E05F 1/1058 |
| | | | 16/76 |
| 3,990,542 A | * | 11/1976 | Dent ......................... F16F 7/09 |
| | | | 188/129 |
| 4,134,703 A | * | 1/1979 | Hinners ............... A63C 11/221 |
| | | | 248/188.5 |
| 4,294,560 A | * | 10/1981 | Larkin .................. F16B 7/1427 |
| | | | 403/104 |
| 4,967,484 A | | 11/1990 | Nosek |

(Continued)

OTHER PUBLICATIONS

International Search Report and Written Opinion issued in PCT/US20/17641, dated Apr. 21, 2020.

(Continued)

*Primary Examiner* — Justin B Rephann
(74) *Attorney, Agent, or Firm* — BakerHostetler

(57) ABSTRACT

A hold open rod includes an inner member; an outer member configured to have the inner member slide in and out of the outer member; and a noncircular dampening member arranged on the inner member. The noncircular dampening member being configured to dampen movement of at least one of the following: the inner member and the outer member.

19 Claims, 26 Drawing Sheets

(56) References Cited

U.S. PATENT DOCUMENTS

| | | | | |
|---|---|---|---|---|
| 5,069,570 | A * | 12/1991 | Pryor | F16M 11/046 403/109.5 |
| 5,174,551 | A * | 12/1992 | Mintgen | F16F 9/0218 188/322.18 |
| 5,249,881 | A * | 10/1993 | Austin, Jr. | F16B 7/14 403/109.5 |
| 5,257,680 | A * | 11/1993 | Corcoran | F16F 7/09 188/290 |
| 5,535,861 | A * | 7/1996 | Young | F16F 9/0227 188/300 |
| 5,595,268 | A * | 1/1997 | Paton | F16F 7/082 188/129 |
| 6,081,965 | A * | 7/2000 | Kupfer | E05C 17/30 16/82 |
| 6,179,749 | B1 * | 1/2001 | Thorn | A63B 21/05 482/44 |
| 6,247,687 | B1 * | 6/2001 | Jensen | F16F 9/3242 188/129 |
| 6,334,730 | B1 * | 1/2002 | Porte | B64D 29/08 403/322.2 |
| 6,386,528 | B1 * | 5/2002 | Thorn | A47C 1/027 188/129 |
| 6,520,493 | B2 * | 2/2003 | Larsen | F16F 7/085 267/293 |
| 6,612,408 | B2 * | 9/2003 | Serkh | F16H 7/1218 188/129 |
| 6,728,993 | B1 * | 5/2004 | Murayama | F16C 17/02 16/342 |
| 6,761,501 | B1 | 7/2004 | Nakatani | |
| 7,228,949 | B2 * | 6/2007 | Namiki | F16F 7/08 267/134 |
| 8,348,028 | B2 * | 1/2013 | Zimmer | F16F 9/368 188/134 |
| 8,534,600 | B2 * | 9/2013 | Bachmeyer | B64C 25/505 244/102 R |
| 8,615,846 | B2 * | 12/2013 | Wheeler | E05F 1/1058 16/49 |
| 9,476,239 | B2 * | 10/2016 | Honeycutt | E06B 3/921 |
| 2009/0300877 | A1 * | 12/2009 | Wood | E05C 17/30 16/71 |
| 2010/0024161 | A1 * | 2/2010 | Wood | E05C 17/30 16/82 |
| 2010/0307872 | A1 * | 12/2010 | Wheeler | E05F 5/00 188/67 |
| 2013/0206955 | A1 * | 8/2013 | Palma | E05C 17/30 248/602 |
| 2016/0069118 | A1 * | 3/2016 | Artin | E05C 17/30 16/85 |

OTHER PUBLICATIONS

International Patent Application No. PCT/US2020/017641; Int'l Preliminary Report on Patentability; dated Aug. 26, 2021; 7 pages.

* cited by examiner

DEVICE AND PROCESS TO DAMPEN VIBRATION IN MULTI-ROD CONFIGURATIONS

CROSS-REFERENCE TO RELATED APPLICATIONS

This application claims the benefit of U.S. Provisional Application No. 62/803,760 filed on Feb. 11, 2019, which is hereby incorporated by reference in its entirety for all purposes as if fully set forth herein.

FIELD OF THE DISCLOSURE

The disclosure relates to a device to dampen vibration in multi-rod configurations. The disclosure further relates to a process to dampen vibration in multi-rod configurations.

BACKGROUND OF THE DISCLOSURE

Hold open rods are well known in both the automotive and aviation industries. Hold open rods may be used to hold a component, such as door, hatch, or the like in an open configuration after the component has been opened manually or automatically. Generally, hold open rods may include two cylindrical, telescoping tubes with an inner tube located inside of an outer tube. Alternatively, hold open rods may include two tubes having a square cross-section, hexagonal cross-section, or the like. In one aspect, a stowed position may be where the inner tube is extended a fraction of the fully extended length from the outer tube. In one aspect, a stowed position may be where the inner tube is extended a large fraction of the fully extended length from the outer tube. In one aspect, a stowed position may be where the inner tube is located almost entirely within the outer tube. When in use, the inner tube may be extended to a designated position in order to hold open the component. In the extended position, the tubes may be locked in place in order to hold the component open with a lock mechanism. The lock mechanism may be used to prevent the inner tube from retracting into the outer tube. A typical hold open rod supports a considerable amount of weight when locked in an open position. Once unlocked, the typical hold open rod allows movement of the component to a closed position.

Hold open rods may be implemented in applications subject to vibration. To address this, the hold open rods may be configured with a rattle space or area of movement where one rod of a multi-rod configuration vibrates with respect to the other rod of the multi-rod configuration. To implement this rattle space of the multi-rod configuration, a cylindrical element has been used with a limited amount of clearance. However, the prior cylindrical elements do not provide sufficient dampening. The result is that one or more of the rods of the multi-rod configuration may start to vibrate in response to vibration and/or acceleration associated with the implementation of the application of the hold open rod. Moreover, at times the vibration may be at or near a natural frequency of the hold open rod system. The result of this vibration can lead to the hold open rod failing, requiring maintenance, requiring replacement, and the like.

Accordingly, a device and process to dampen vibration in multi-rod configurations is needed to reduce failure and maintenance.

SUMMARY OF THE DISCLOSURE

The foregoing needs are met, to a great extent, by the disclosure, wherein in one aspect a device and process to dampen vibration in multi-rod configurations is provided.

One aspect includes a hold open rod that includes an inner member; an outer member configured to have the inner member slide in and out of the outer member; and a noncircular dampening member arranged on the inner member, the noncircular dampening member being configured to dampen movement of at least one of the following: the inner member and the outer member.

One aspect includes a hold open rod that includes an inner member; an outer member configured to have the inner member located at least partially within the outer member; and a noncircular dampening member within the outer member, the noncircular dampening member being configured to dampen movement of at least one of the following: the inner member and the outer member.

One aspect includes a hold open rod that includes an inner member; an outer member configured to have the inner member slide in and out of the outer member; and a first noncircular dampening member arranged on the inner member, the first noncircular dampening member being configured to dampen movement of at least one of the following: the inner member and the outer member, a second noncircular dampening member arranged in the outer member, the second noncircular dampening member being configured to dampen a movement of at least one of the following: the inner member and the outer member.

One aspect includes a hold open rod that includes an inner member; an outer member configured to have the inner member slide in and out of the outer member; and a dampening member having a noncircular inner surface arranged on the inner member, the dampening member being configured to dampen movement of at least one of the following: the inner member and the outer member.

Implementations may include one or more of the following features. The hold open rod may include a locking mechanism configured to selectively lock the inner member and the outer member with respect to each other. The non-circular dampening member that includes a polygonal shaped member. The non-circular dampening member that includes a lobed shaped member. The noncircular dampening member that includes a three-lobed shaped member. The noncircular dampening member is configured to rotate about the inner member. The inner member that includes a reduced diameter portion and the noncircular dampening member is arranged on the reduced diameter portion. The noncircular dampening member that includes a three-lobed shaped member; the noncircular dampening member is configured to rotate about the inner member; and the inner member that includes a reduced diameter portion and the noncircular dampening member is arranged on the reduced diameter portion. The hold open rod that includes a fastener for attaching the hold open rod to a door or hatch. The hold open rod is attached to an aircraft.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

DETAILED DESCRIPTION

Figure 1:
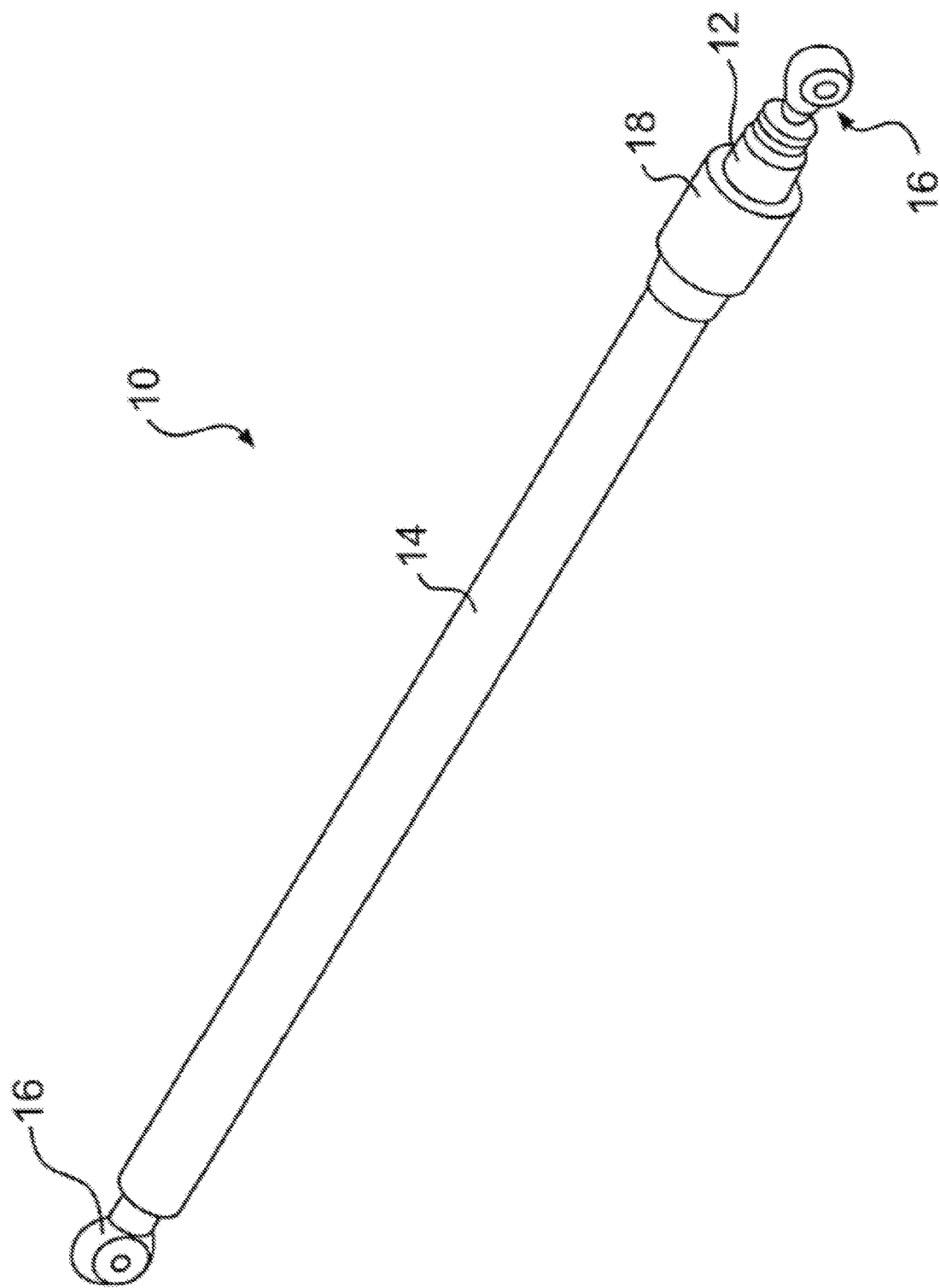
FIG. 1 illustrates a perspective view of a hold open rod according to an aspect of the disclosure.

The disclosure will now be described with reference to the drawing figures, in which like reference numerals refer to like parts throughout. Aspects of the disclosure advantageously provide a device and process to dampen vibration in multi-rod configurations.

Prior cylindrical elements in hold open rods did not provide sufficient dampening. The result was one or more of the rods of the hold open rod would start to vibrate in response to vibration and/or acceleration associated with the implementation of application. In aspects of the disclosure, by replacing a cylindrical vibration element with a non-circular shaped vibration element, a polygonal shaped vibration element, a multi-lobe shaped vibration element and/or the like that results in improved dampening of the vibration associated with a hold open rod system. This improved dampening may reduce failures of the hold open, may reduce maintenance of the hold open rod, may allow the hold open rod to be manufactured utilizing less robust components, less costly components, and the like.

FIG. 1 illustrates a perspective view of a hold open rod according to an aspect of the disclosure.

In particular, FIG. 1 illustrates a hold open rod system 10. The hold open rod system 10 may include an inner tube 12 and an outer tube 14. The outer tube 14 may at least partially surround the inner tube 12. One or both ends of the hold open rod system 10 may include a fastener 16 for coupling the hold open rod system 10 to a particular application, for example, an aircraft door, a door frame, or the like (not shown). In further aspects, the hold open rod system 10 may include more than two tubes each telescoping into the other. However, for brevity and ease of understanding, the hold open rod system 10 will be described in the disclosure with respect to a two-rod implementation of the hold open rod system 10. Nevertheless, the various features may be implemented in a multi-rod system.

The inner tube 12 may be configured to slide into the outer tube 14 to shorten a length of the hold open rod system 10 such as when a door, hatch, or the like is shut. Then when the door or hatch is opened, the inner tube 12 may slide out of the outer tube 14. The inner tube 12 and the outer tube 14 may be made of metal such as aluminum, titanium, steel, and the like. The inner tube 12 and the outer tube 14 may be made of a synthetic material, composite materials such as carbon fiber, or any other suitable materials. The inner tube 12 and the outer tube 14 may be made of the same material; or the inner tube 12 and the outer tube 14 may be made of different materials. The inner tube 12 and the outer tube 14 may have a cylindrical cross-section, a square cross-section, a hexagonal cross-section, a polygonal cross-section, or the like.

In some aspects, locking the inner tube 12 with respect to the outer tube 14 may be beneficial. In these aspects, the inner tube 12 may be locked with respect to the outer tube 14 utilizing a locking mechanism 18. The locking mechanism 18 may be internal to the hold open rod system 10, may be external to the hold the hold open rod system 10, may be a combination thereof, or the like. However, in other aspects the hold open rod system 10 may not utilize any form of locking mechanism.

Figure 2:
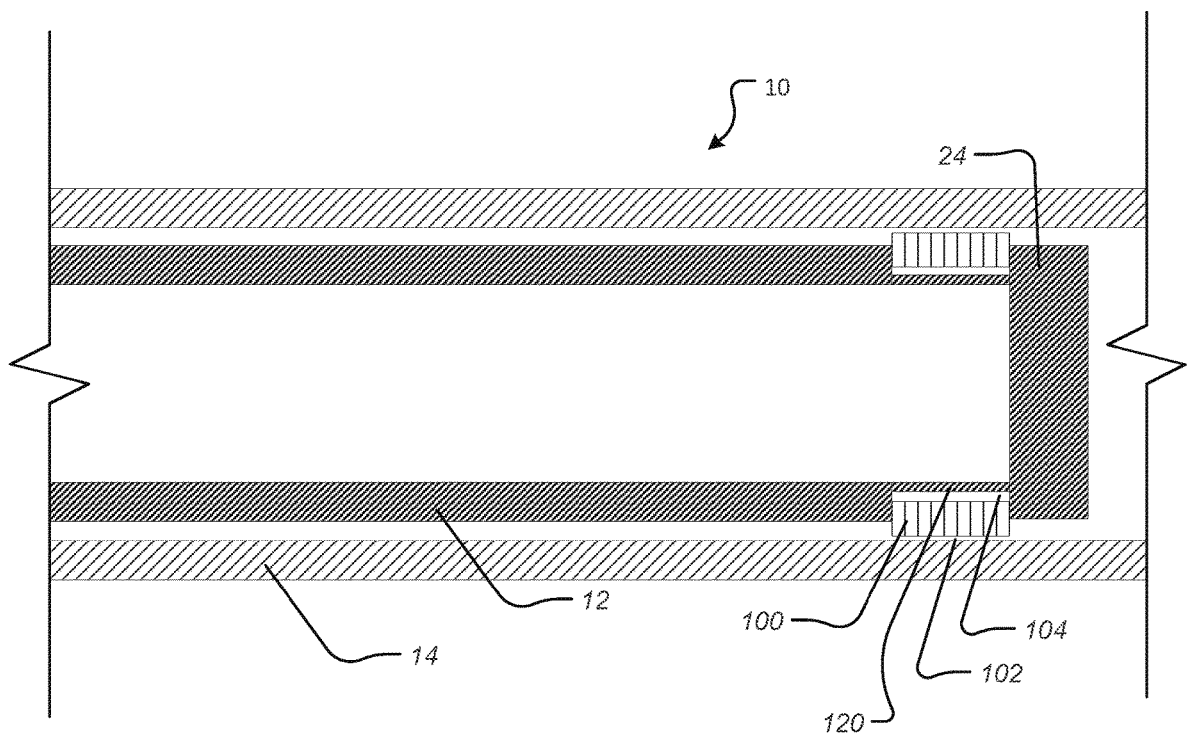
FIG. 2 illustrates a partial cross-sectional view of the hold open rod according to FIG. 1.

FIG. 2 illustrates a partial cross-sectional view of the hold open rod according to FIG. 1.

In particular, FIG. 2 illustrates the inner tube 12 at least partially arranged within the outer tube 14. The hold open rod system 10 may be configured to have a rattle space or area of movement for the inner tube 12 and the outer tube 14. The rattle space or area of movement may beneficially allow the inner tube 12, the outer tube 14, and other components of the hold open rod system 10 to move, vibrate, or the like. In one aspect, the rattle space or area of movement may beneficially allow one of the inner tube 12 and the outer tube 14 to move and/or vibrate with respect to the other rod of the inner tube 12 and the outer tube 14. As illustrated in FIG. 2, the rattle space or area of movement may include a space 102 and/or a space 104. The space 102 may be configured adjacent a dampening member 100 between the inner tube 12 and the outer tube 14. The space 104 may be located between the inner tube 12 and the dampening member 100. However, the space 102 and/or the space 104 may be configured and located in other areas of the hold open rod system 10.

The dampening member 100 may be located on the inner tube 12. The inner tube 12 may have a reduced diameter portion 120 and the dampening member 100 may be located on the reduced diameter portion 120. In other aspects, the dampening member 100 may be located in other portions of the hold open rod system 10. The dampening member 100 together with the space 104 and/or the space 102 may prevent and/or reduce any undesired vibration, dynamic instability, and the like.

In one aspect, the dampening member 100 may be a non-circular component. In one aspect, the dampening member 180 may be a polygonal-shaped component. In one aspect, the dampening member 180 may be a lobed component. In one aspect, the dampening member 100 may be a mufti-lobed component. Other shapes of the dampening member 108 are contemplated by the disclosure and/or disclosed herein.

In one aspect, the dampening member 180 may be made of a synthetic material. In one aspect, the dampening member 100 may be made of a plastic material. In one aspect, the dampening member 100 may be made of a polyamideimide material. In one aspect, the dampening member 100 may be made of a polyamideimide and glass fiber composite material.

In one aspect, the dampening member 180 may be implemented with one or more lobes. In one aspect, the dampening member 108 may have three lobes. The dampening member 100 may be located at the end of the inner tube 12 adjacent a tube stop 24. The dampening member 100 may have a cylindrical inside diameter. The dampening member 100 may be configured to rotate about the end of the inner tube 12 at the tube stop 24. This ability to rotate provides an additional intentional dynamic instability that may help dampen vibration.

Figure 3:
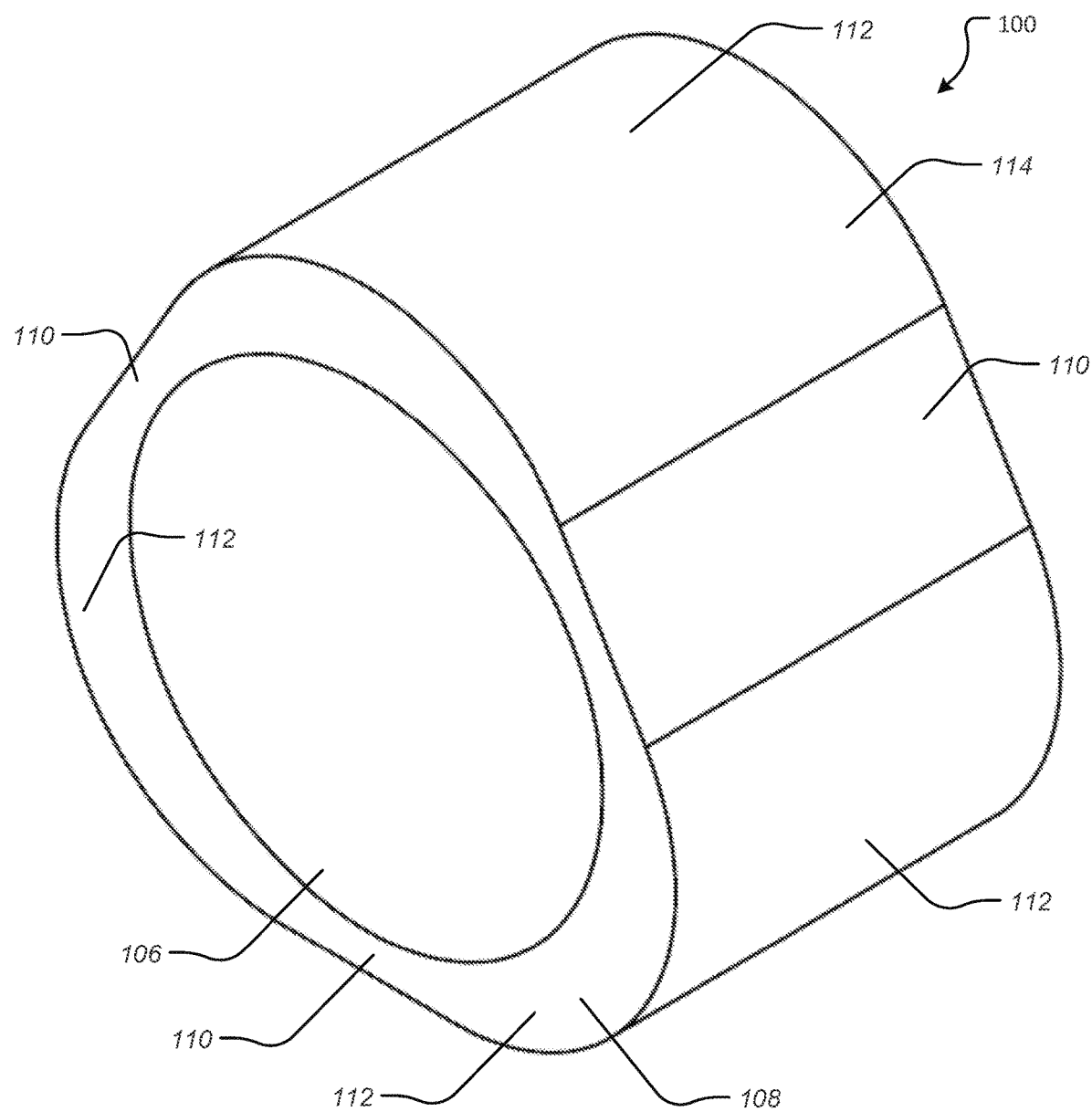
FIG. 3 illustrates a perspective view of a dampening member according to an aspect of the disclosure.
Figure 4:
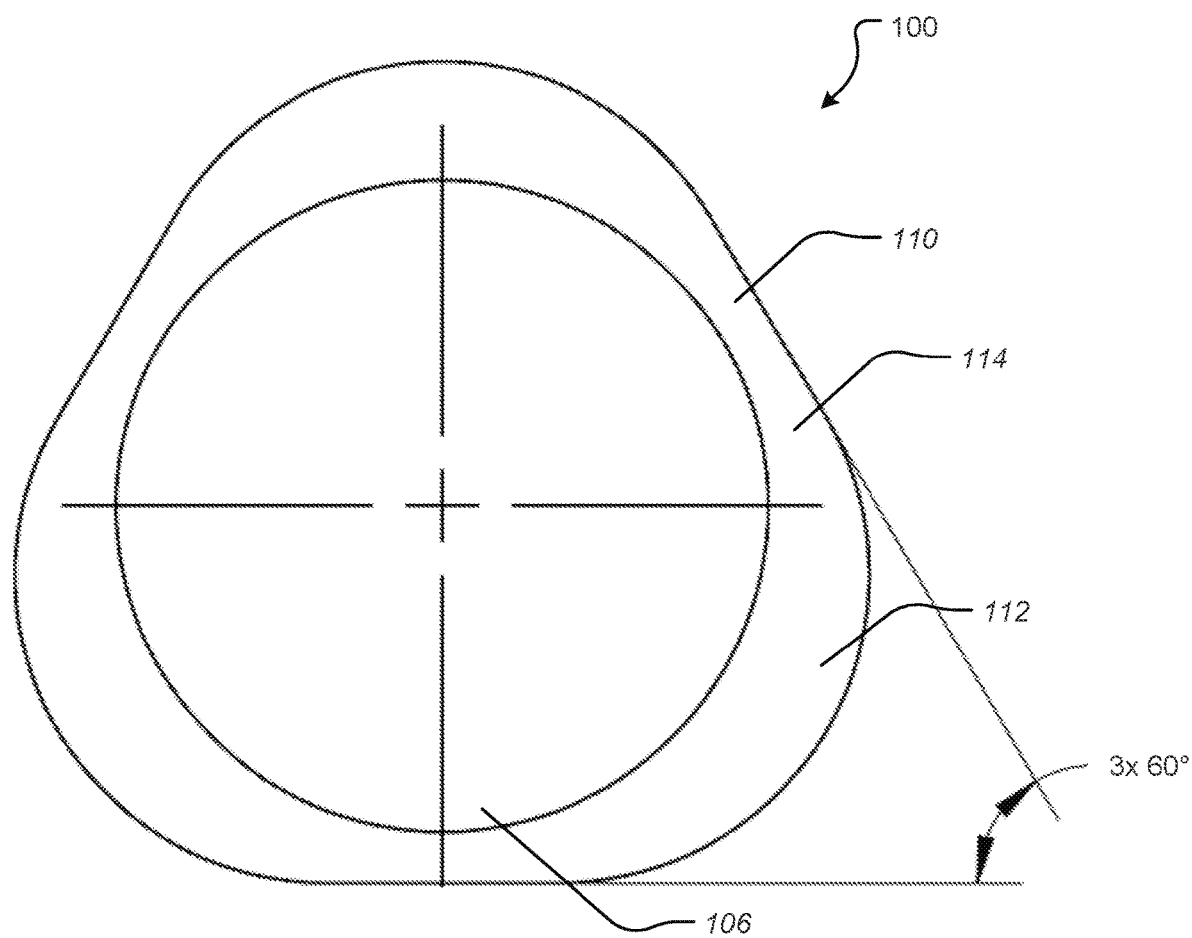
FIG. 4 illustrates a front view of the dampening member of FIG. 3.

FIG. 3 illustrates a perspective view of a dampening member according to an aspect of the disclosure; FIG. 4 illustrates a front view of the dampening member of FIG. 3; and FIG. 5 illustrates a top view of the dampening member of FIG. 3.

Figure 5:
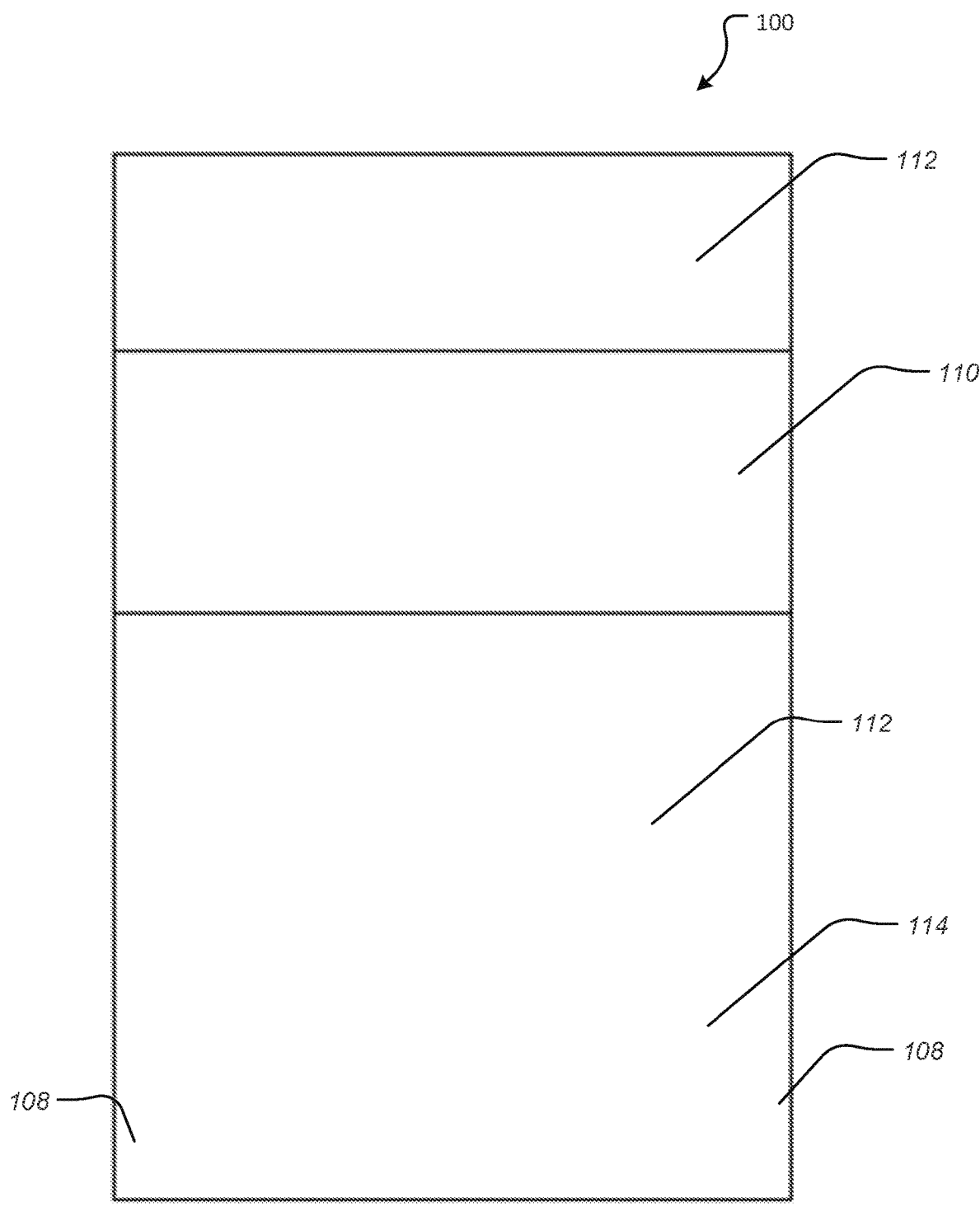
FIG. 5 illustrates a top view of the dampening member of FIG. 3.

In particular, FIG. 3, FIG. 4, and FIG. 5 illustrate one aspect of the dampening member 100. In the aspect of these Figures, the dampening member 100 may be a multi-lobed configuration. In particular, the dampening member 100 may include one or more lobes. In one aspect, the dampening member 100 may include three lobe portions 112. In one aspect, the dampening member 100 may include N number of lobe portions 112 (where N is an integer). In one aspect, the lobe portions 112 may be arranged symmetrically on the dampening member 100. In one aspect, the lobe portions 112 may be arranged asymmetrically on the dampening member 100 (not shown).

In one aspect, the dampening member 100 may include a flat portion 110 between one or more of the lobe portions 112. In one aspect, the dampening member 100 may include a flat portion 110 arranged between each of the plurality of the lobe portion 112. In one aspect, the dampening member 100 may include three flat portions 110 between each of the three lobe portions 112.

In one aspect, the dampening member 100 may include an outer surface 114. In one aspect the outer surface 114 may include the flat portion 110. In one aspect the outer surface 114 may include the lobe portion 112. In one aspect the outer surface 114 may include the flat portion 110 and the lobe portion 112. In one aspect, the flat portion 110 may tangentially connect to the lobe portion 112. As illustrated in FIG. 4, a surface of the flat portion 110 between adjacent flat surfaces may form an angle of 60°.

In one aspect, the dampening member 100 may include an inner surface 106. In one aspect, the dampening member 100 may include an inner surface 106 that forms a cylindrical aperture that extends through the dampening member 100. In one aspect, the dampening member 100 may include an inner surface 106 that forms a cylindrical aperture that extends through the dampening member 100 and is configured to receive the inner tube 12. In one aspect, the dampening member 100 may include an inner surface 106 that forms a cylindrical aperture that extends through the dampening member 100, may be configured to receive the inner tube 12, and the cylindrical aperture of the inner surface 106 may be sized to allow the dampening member 100 to rotate about the inner tube 12.

In one aspect, the dampening member 100 may include an end portion 108. In one aspect, the end portion 108 may be located on opposing sides of the dampening member 100. In one aspect, the end portion 108 may form a generally flat surface. The end portion 108 may have other shapes as well.

Figure 6:
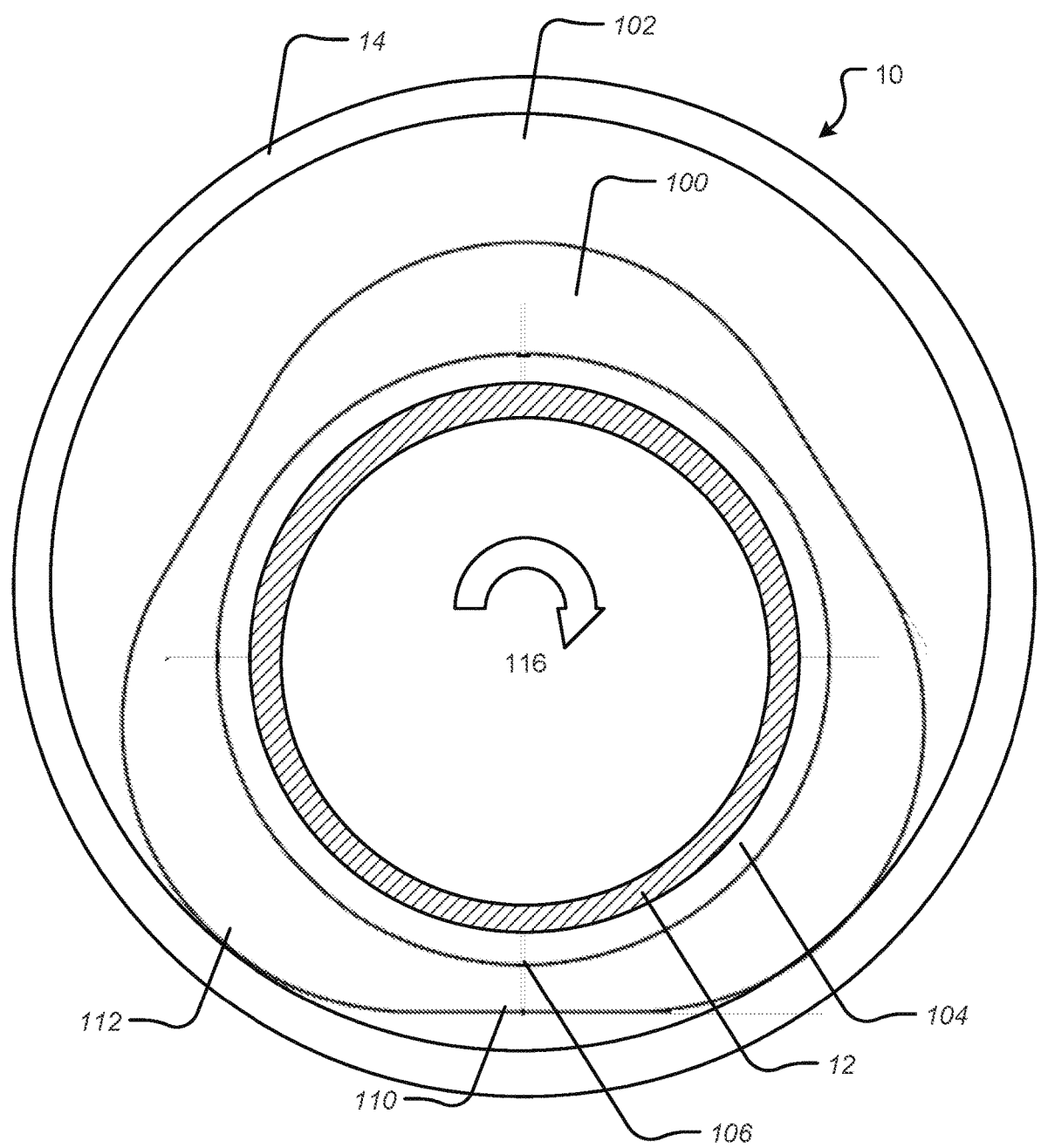
FIG. 6 illustrates another cross-sectional view of the hold open rod according to FIG. 1.

FIG. 6 illustrates another cross-sectional view of the hold open rod according to FIG. 1.

In particular, FIG. 6 illustrates the dampening member 100 arranged on the inner tube 12 and arranged inside the outer tube 14. As further shown in FIG. 6, the location of the space 102 between the dampening member 100 and the outer tube 14 is illustrated. As further shown in FIG. 6, the space 104 allows for the dampening member 100 to rotate about the inner tube 12 as illustrated by arrow 116. In particular, the configuration of the dampening member 100 to rotate about the inner tube 12 may provide additional intentional dynamic instability that may help dampen vibration.

Figure 7:
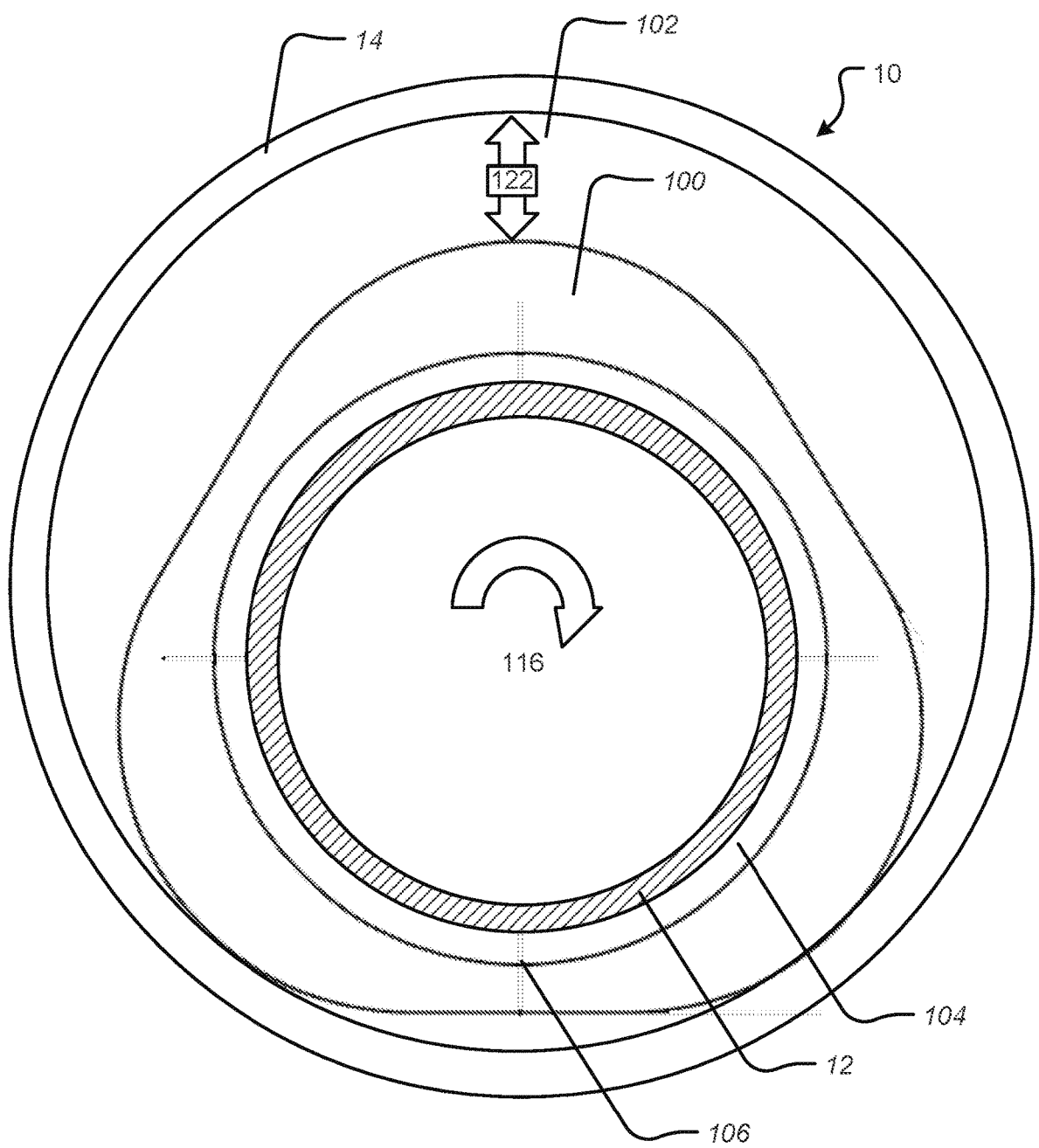
FIG. 7 illustrates another cross-sectional view of the hold open rod according to FIG. 1 with a dampening member in a first orientation.
Figure 8:
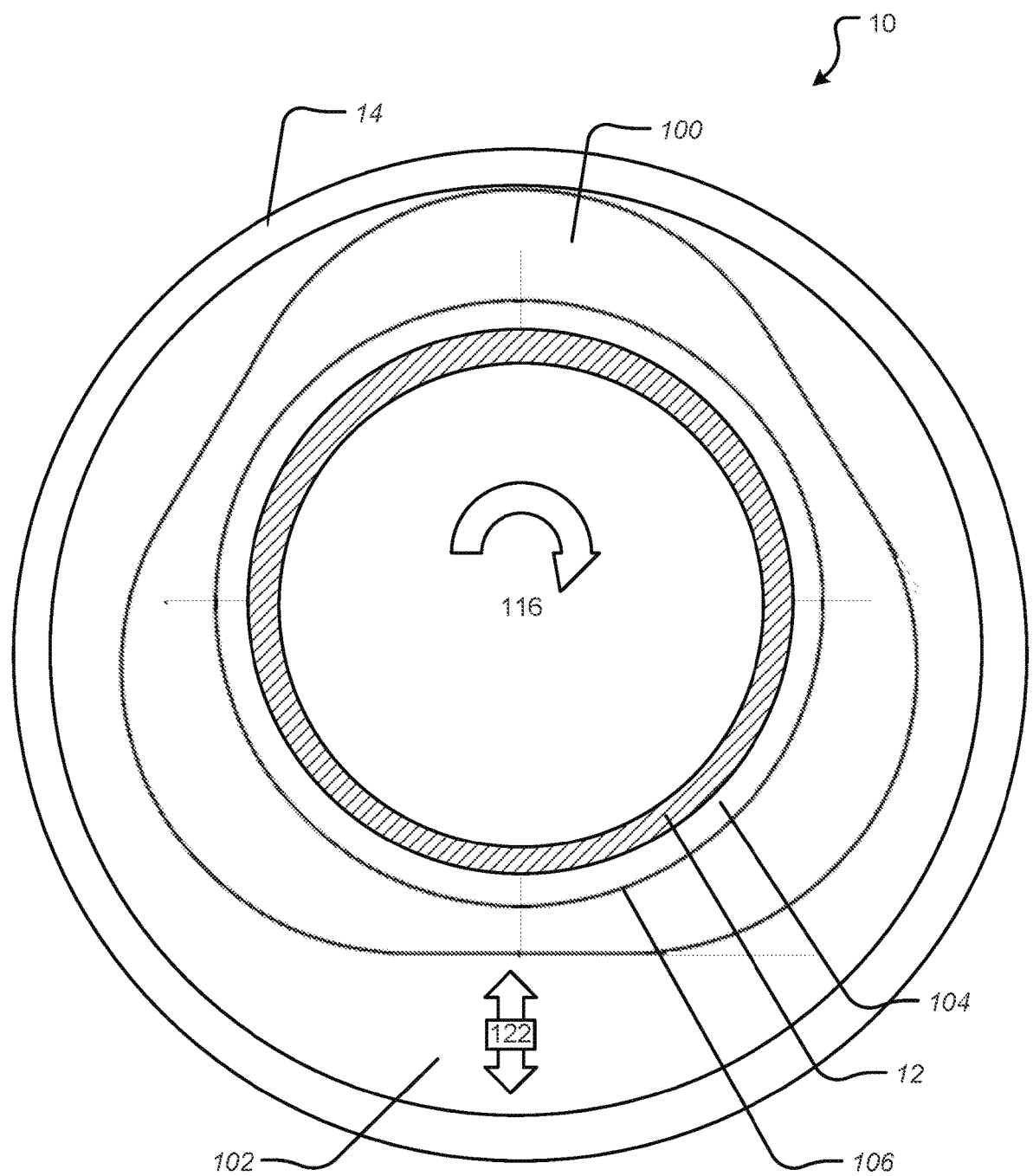
FIG. 8 illustrates another cross-sectional view of the hold open rod according to FIG. 7.

FIG. 7 illustrates another cross-sectional view of the hold open rod according to FIG. 1 with a dampening member in a first orientation; and FIG. 8 illustrates another cross-sectional view of the hold open rod according to FIG. 7.

As illustrated in FIG. 7 and FIG. 8, the space 102 between the dampening member 100 and the outer tube 14 may allow the inner tube 12 and the dampening member 100 to move and/or vibrate in the direction of arrow 122. FIG. 7 shows the dampening member 100 and the inner tube in a lower position: and FIG. 8 shows the dampening member 100 and the inner tube in an upper position.

Additionally, as shown in FIG. 6, there is a space 104 between the dampening member 100 and the inner tube 12. The dampening member 100 together with the space 104 may be configured to rotate about the end of the inner tube 12 at the tube stop 24. This ability to rotate provides additional intentional dynamic instability.

Figure 9:
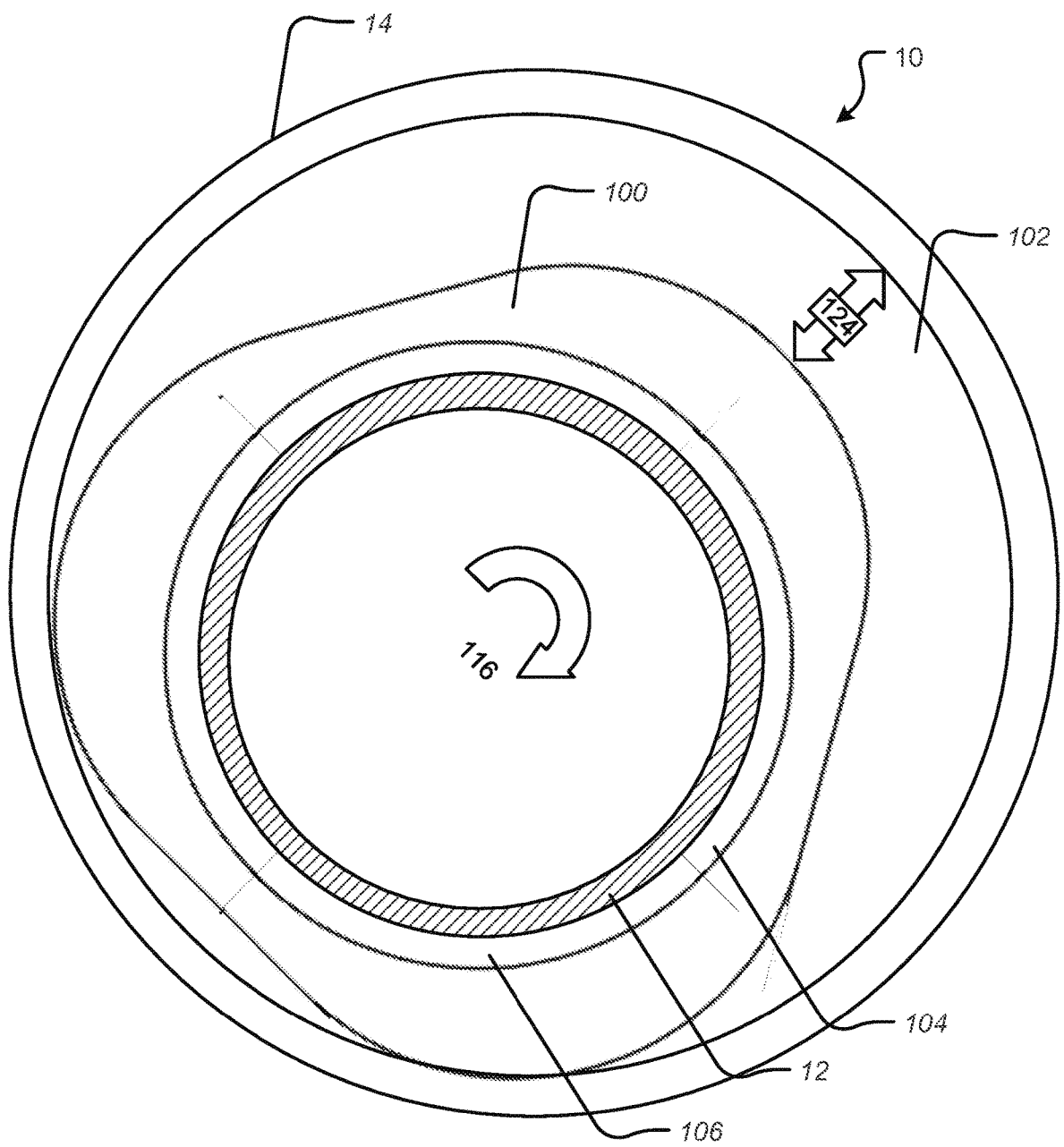
FIG. 9 illustrates another cross-sectional view of the hold open rod according to FIG. 1 with a dampening member in a second orientation.
Figure 10:
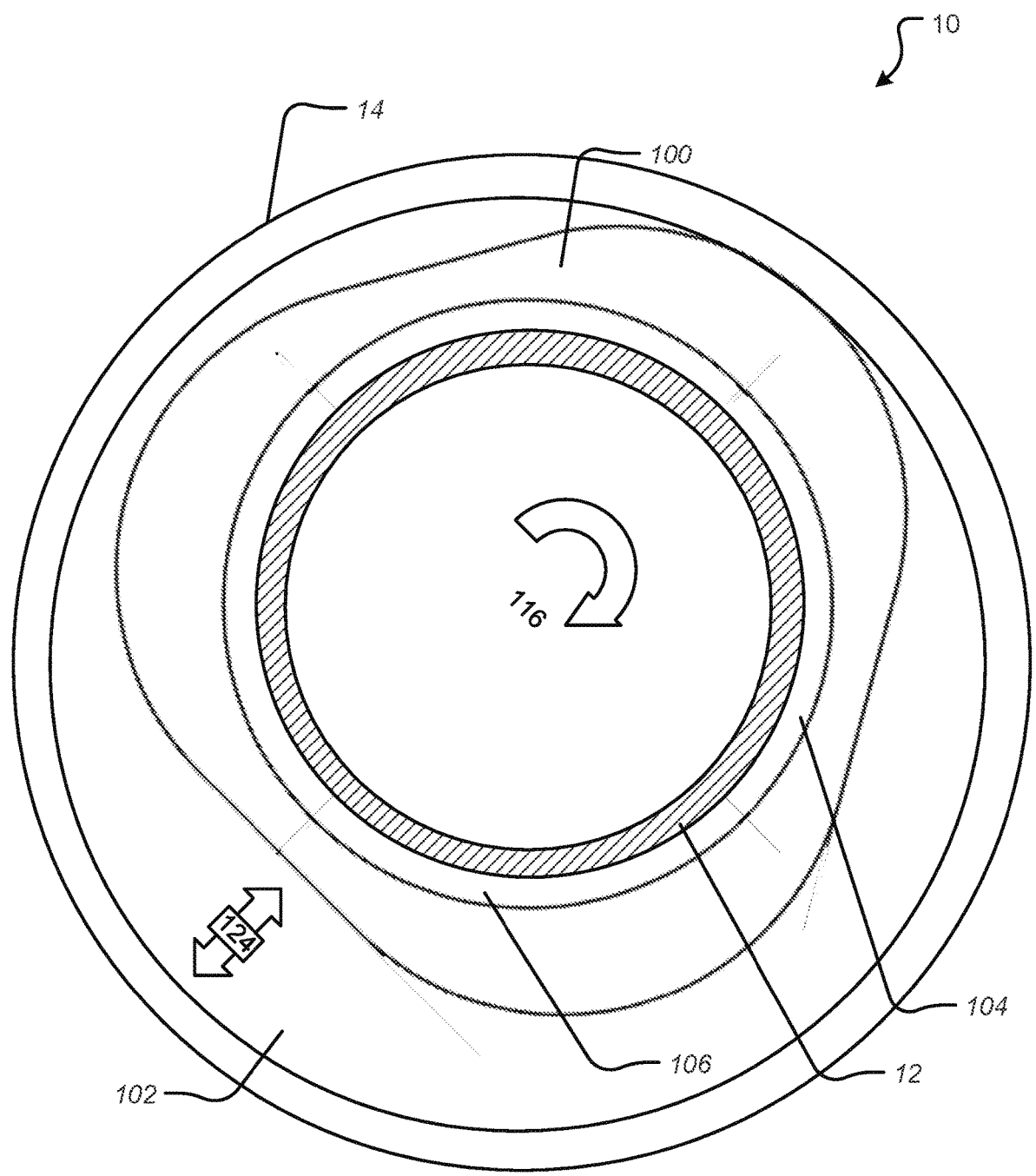
FIG. 10 illustrates another cross-sectional view of the hold open rod according to FIG. 9.

FIG. 9 illustrates another cross-sectional view of the hold open rod according to FIG. 1 with a dampening member in a second orientation; and FIG. 10 illustrates another cross-sectional view of the hold open rod according to FIG. 9.

As illustrated in FIG. 9 and FIG. 10, the dampening member 100 has rotated such that the space 102 is now located at a different position. The space 102 between the dampening member 100 and the outer tube 14 may allow the inner tube 12 and the dampening member 100 to move and/or vibrate in the direction of arrow 124. FIG. 9 shows the dampening member 100 in the inner tube 12 in a lower left position; and FIG. 10 shows the dampening member 100 and the inner tube 12 in an upper right position.

During an operational implementation of the hold open rod system 10, the dampening member 100 may be in a first orientation as illustrated in FIG. 7 and FIG. 8. Accordingly, the inner tube 12 and dampening member 100 may vibrate in a direction of arrow 122. As illustrated in FIG. 7, the dampening member 100 has two of the lobe portions 112 contacting an inner surface of the outer tube 14. The dampening member may vibrate upwardly in the direction of arrow 122 such that another one of the lobe portions 112 contacts another portion of an inner surface of the outer tube 14 as illustrated in FIG. 8. The lobe portions 112 of the dampening member 100 may dampen the vibrational movement of the inner tube 12.

Subsequently, the dampening member 100 may rotate in the direction of arrow 116 (or a direction opposite the arrow 116) as illustrated in FIG. 9 and FIG. 10 to be in a second orientation. In this regard, the dampening member 100 may have an infinite number of orientations defined as being 360° around the inner tube 12. Rotation of the dampening member 100 may be caused by the vibration experienced by the hold open rod system 10, In other words, as the hold open rod system 10 vibrates, the dampening member 100 may rotate about the inner tube 12.

As illustrated in FIG. 9, the dampening member 100 has two of the lobe portions 112 contacting an inner surface of the outer tube 14 (along the bottom and side thereof). The dampening member 100 may vibrate upwardly and to the right in the direction of arrow 124 such that another one of the lobe portions 112 contacts another portion of an inner surface of the outer tube 14 as illustrated in FIG. 10. The lobe portions 112 of the dampening member 100 may dampen the vibrational movement of the inner tube 12.

As described herein, the rotational movement of the dampening member 100 as illustrated in FIGS. 7-10 changes the axis of vibration of the dampening member 100 as well as the inner tube 12, This rotational movement of the dampening member 100 as well as changing the axis of vibration provides instability to the system that results in increased dampening. This increased dampening is in an unexpected result. Moreover, this dampening is markedly much better, much greater, then prior art circular implementations of dampening members. This increased dampening may reduce failures of the hold open rod system 10, may reduce maintenance of the hold open rod system 10, may allow the hold open rod system 10 to be manufactured utilizing less robust components, less costly components, and the like.

Figure 11:
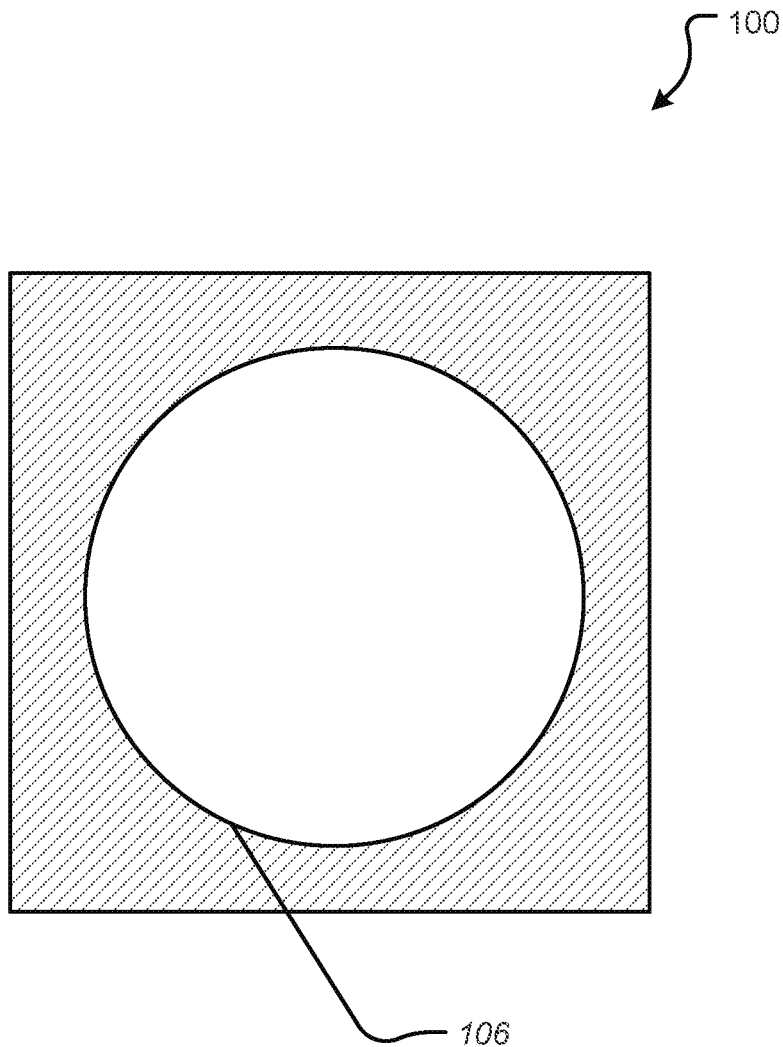
FIG. 11 illustrates a front view of another dampening member according to the disclosure.

FIG. 11 illustrates a front view of another dampening member according to the disclosure. In particular, FIG. 11 illustrates an aspect of the dampening member 100 having a polygonal or square cross-section. The various other aspects of the hold open rod system 10 described above may be utilized in this particular aspect of the dampening member 100.

Figure 12:
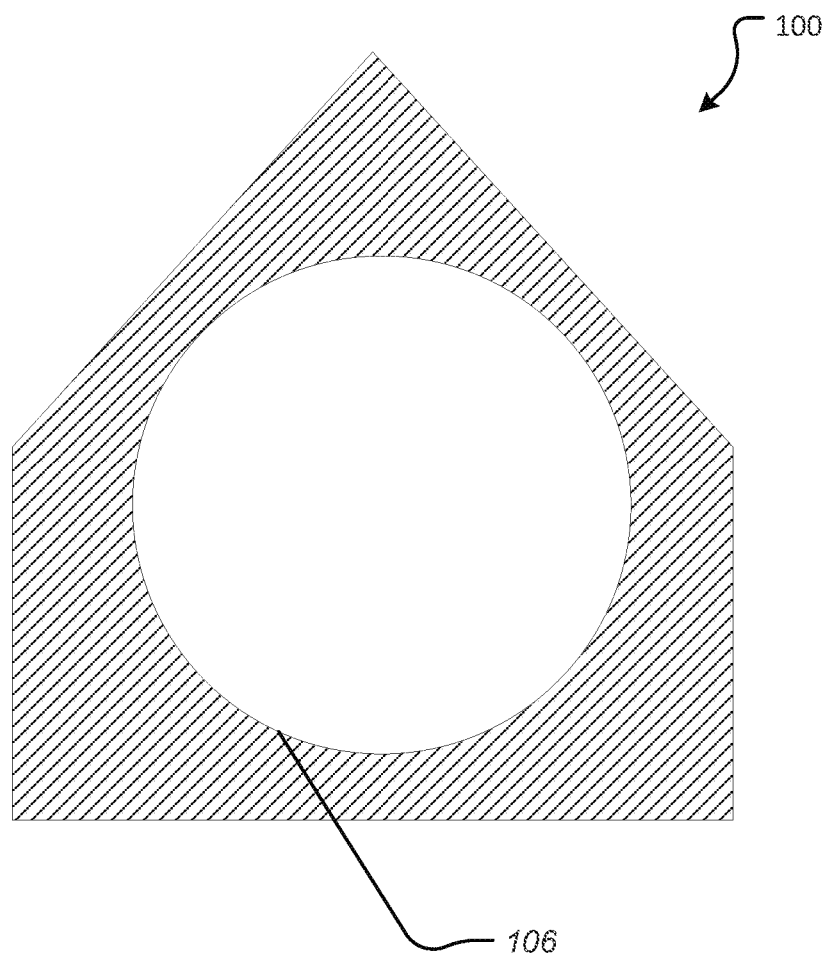
FIG. 12 illustrates a front view of another dampening member according to the disclosure.

FIG. 12 illustrates a front view of another dampening member according to the disclosure. In particular, FIG. 12 illustrates an aspect of the dampening member 100 having a polygonal cross-section. The various other aspects of the hold open rod system 10 described above may be utilized in this particular aspect of the dampening member 100.

Figure 13:
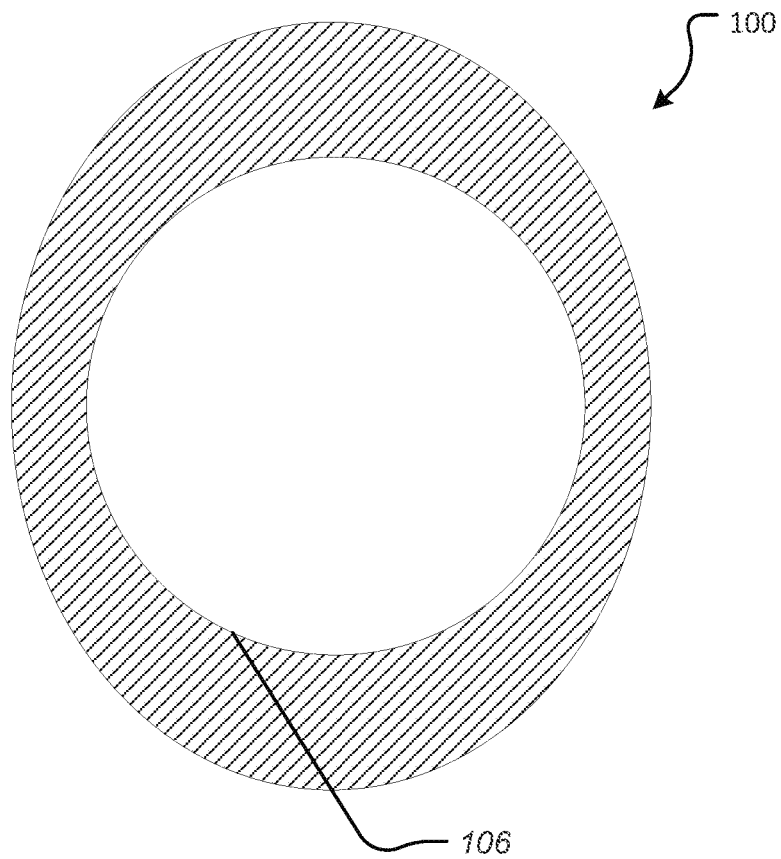
FIG. 13 illustrates a front view of another dampening member according to the disclosure.

FIG. 13 illustrates a front view of another dampening member according to the disclosure. In particular, FIG. 13 illustrates an aspect of the dampening member 100 having an oval cross-section. The various other aspects of the hold open rod system 10 described above may be utilized in this particular aspect of the dampening member 100.

Figure 14:
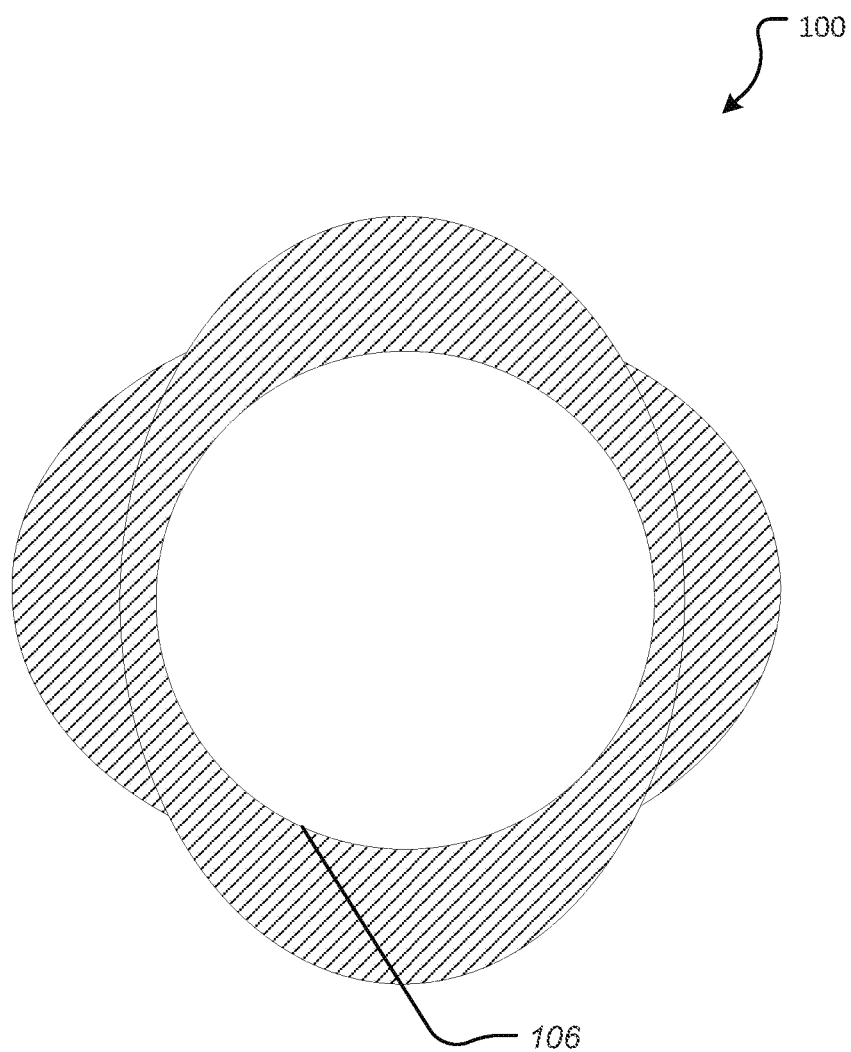
FIG. 14 illustrates a front view of another dampening member according to the disclosure.

FIG. 14 illustrates a front view of another dampening member according to the disclosure. In particular, FIG. 14 illustrates an aspect of the dampening member 100 having a multi-lobe oval cross-section. The various other aspects of the hold open rod system 10 described above may be utilized in this particular aspect of the dampening member 100.

Figure 15:
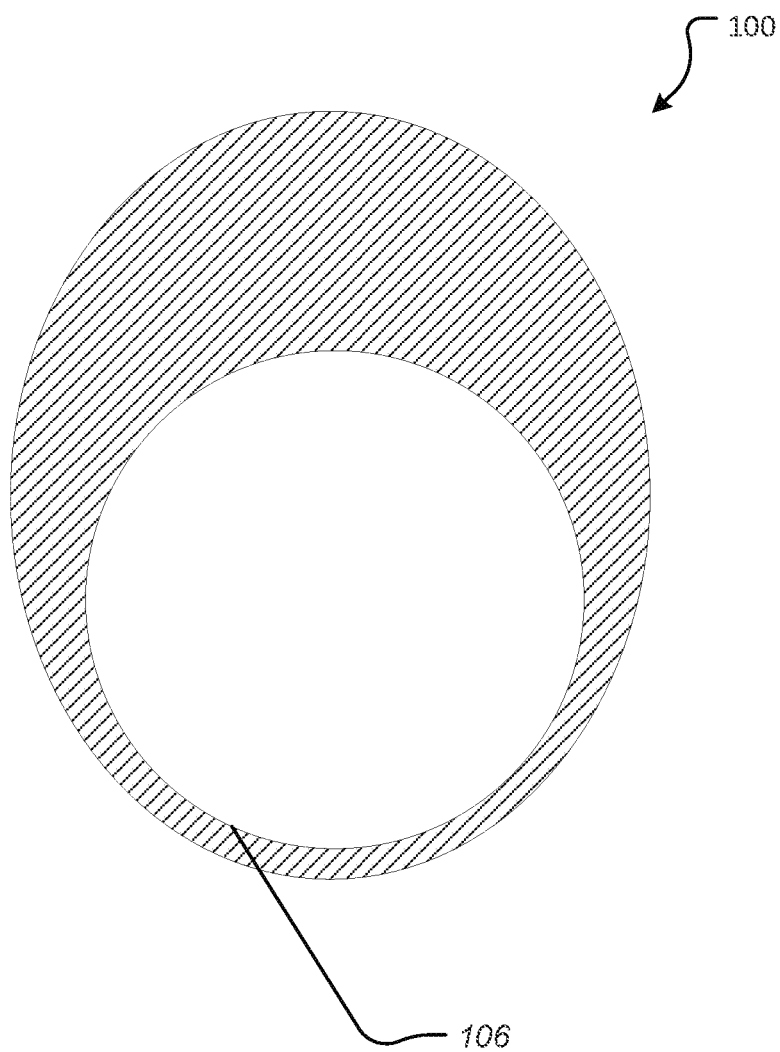
FIG. 15 illustrates a front view of another dampening member according to the disclosure.

FIG. 15 illustrates a front view of another dampening member according to the disclosure. In particular, FIG. 15 illustrates an aspect of the dampening member 100 having an off axis oval cross-section. The various other aspects of the hold open rod system 10 described above may be utilized in this particular aspect of the dampening member 100.

Figure 16:
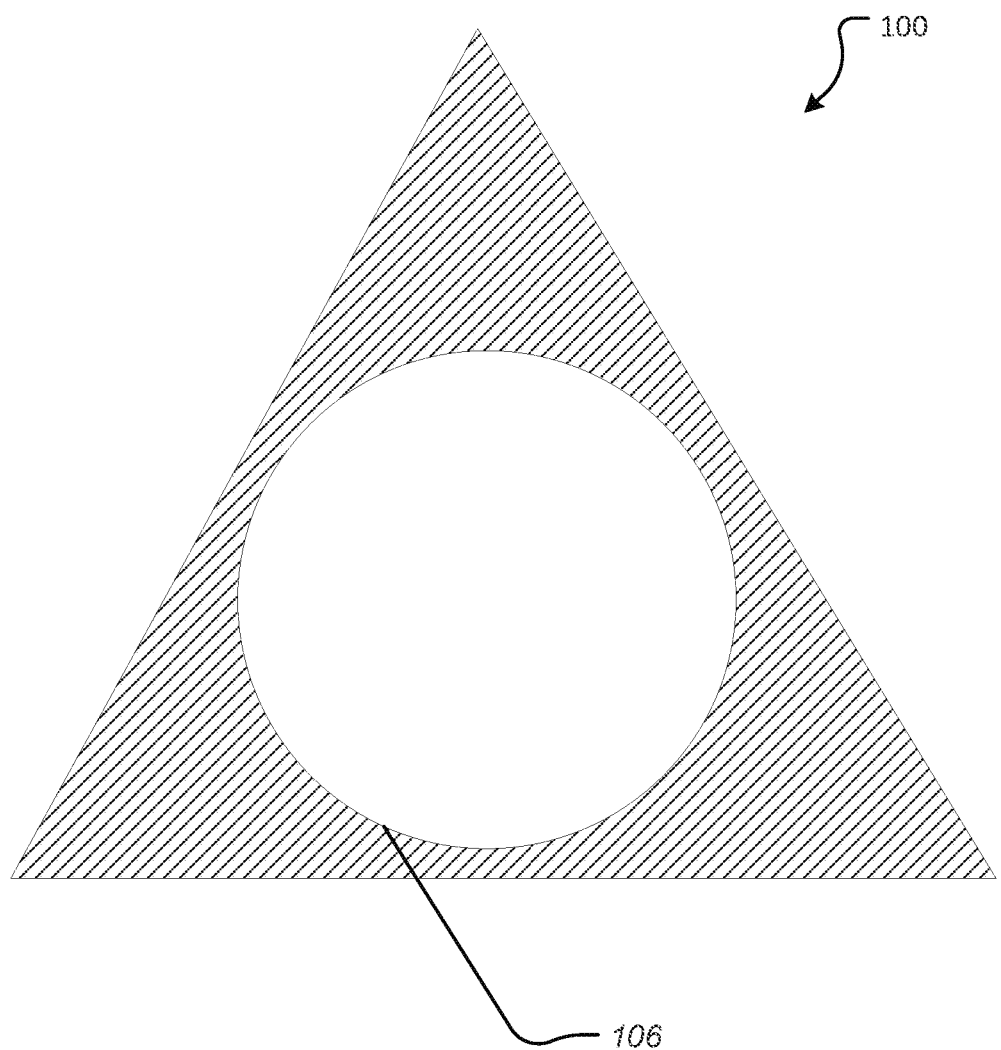
FIG. 16 illustrates a front view of another dampening member according to the disclosure.

FIG. 16 illustrates a front view of another dampening member according to the disclosure. In particular, FIG. 16 illustrates an aspect of the dampening member 100 having triangle cross-section. The various other aspects of the hold open rod system 10 described above may be utilized in this particular aspect of the dampening member 100.

Figure 17:
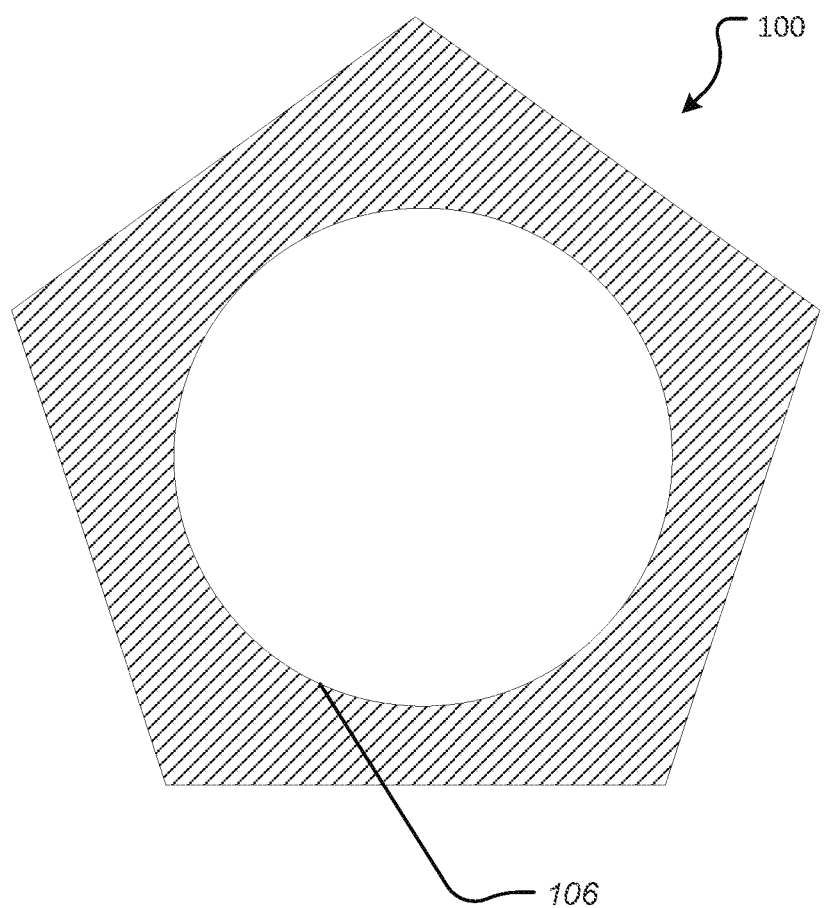
FIG. 17 illustrates a front view of another dampening member according to the disclosure.

FIG. 17 illustrates a front view of another dampening member according to the disclosure. In particular, FIG. 17 illustrates an aspect of the dampening member 100 having a pentagonal cross-section. The various other aspects of the hold open rod system 10 described above may be utilized in this particular aspect of the dampening member 100.

The disclosure is also directed to a process of damping a hold open rod system 10. The process may include providing an inner member; providing an outer member configured to have the inner member boated at least partially within the outer member; and providing a noncircular dampening member within the outer member, the noncircular dampening member being configured to dampen movement of at least one of the following: the inner member and the outer member.

Figure 18:
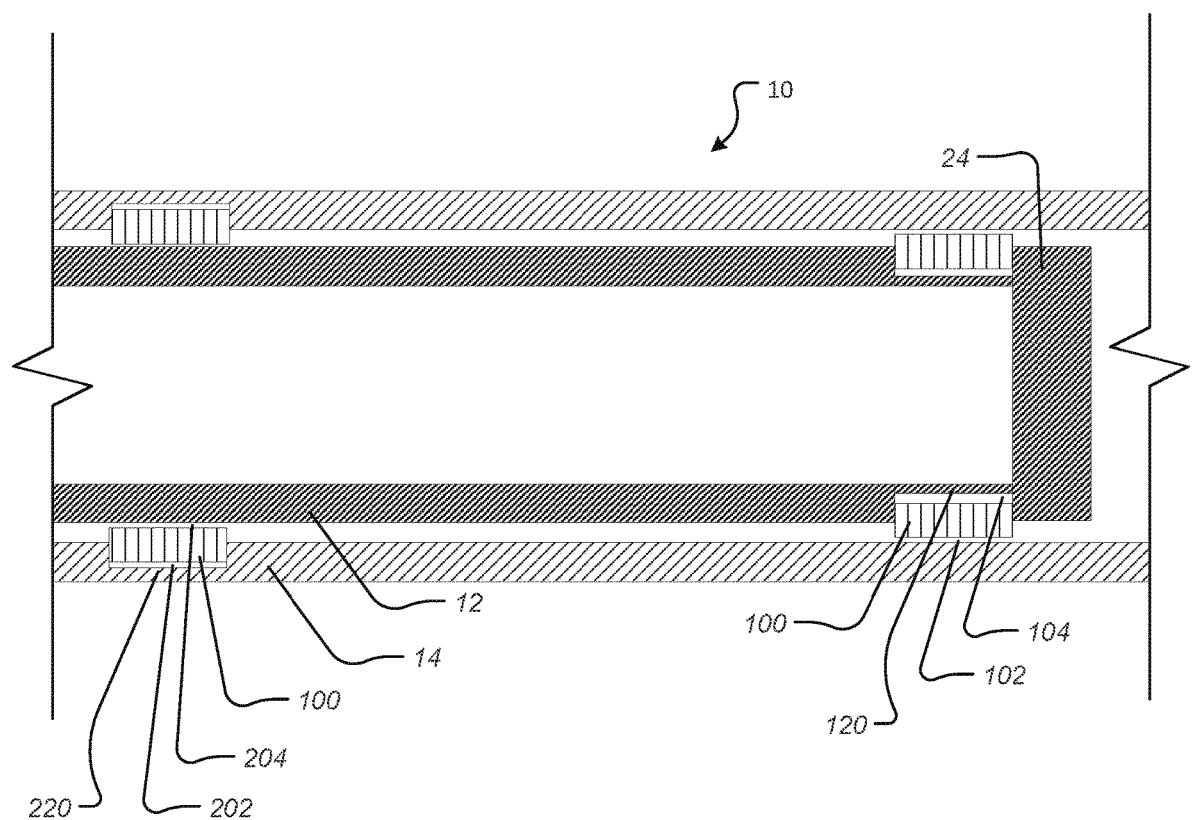
FIG. 18 illustrates a partial cross-sectional view of a hold open rod according to another aspect of the disclosure.

FIG. 18 illustrates a partial cross-sectional view of a hold open rod according to another aspect of the disclosure.

In particular, FIG. 18 illustrates an implementation where the hold open rod system 10 may be configured as a strut with the inner tube 12 and the outer tube 14 configured in a non-telescopic configuration, a permanently locked configuration, or the like. In this aspect, the hold open rod system 10 may be configured such that the inner tube 12 and the outer tube 14 may be permanently locked, connected, or the like with respect to one another. In this aspect, the inner tube 12, having a smaller diameter, may extend partially into the outer tube 14, which has a larger diameter. In this aspect, the inner tube 12 may not further extend from or further retract into the outer tube 14.

FIG. 18 further illustrates that the hold open rod system 10 may Include at least two of the dampening member 100. In one aspect, a dampening member 100 may be arranged on the inner tube 12. In one aspect, a dampening member 100 may be arranged in the outer tube 14. In one aspect, a dampening member 100 may be arranged on the inner tube 12 and a dampening member 100 may be arranged in the outer tube 14. In one aspect, a dampening member 100 may be arranged on an end of the inner tube 12 and a dampening member 100 may be arranged in an end of the outer tube 14.

As illustrated in FIG. 18, a rattle space or area of movement may be included with the hold open rod system 10 and may include a space 202 and/or a space 204 in a manner similar to the space 102 and/or the space 104 described above. The outer tube 14 may have a diameter portion 220 and the dampening member 100 may be located on the diameter portion 220.

In one aspect, when the dampening member 100 is arranged in the outer tube 14 on the diameter portion 220, the inner tube 12 may contact the inner surface 106 with configurations of the dampening member 100 consistent with FIGS. 19-26.

Figure 19:
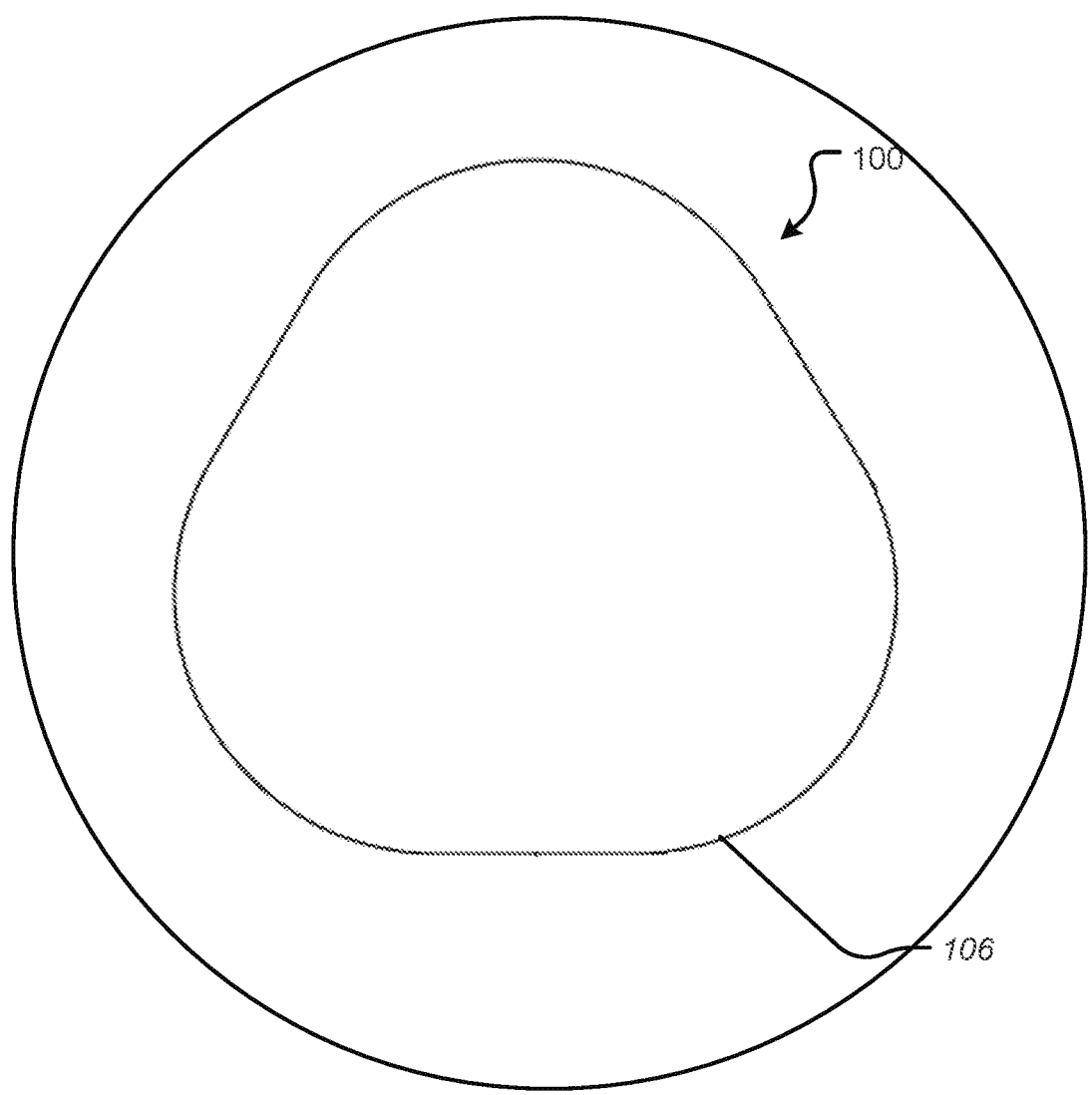
FIG. 19 illustrates a front view of another dampening member according to the disclosure.

FIG. 19 illustrates a front view of another dampening member according to the disclosure. In particular, FIG. 19 illustrates an aspect of the dampening member 100 having a mufti-lobe shaped implementation of the inner surface 106. The various other aspects of the hold open rod system 10 described above may be utilized in this particular aspect of the dampening member 100.

Figure 20:
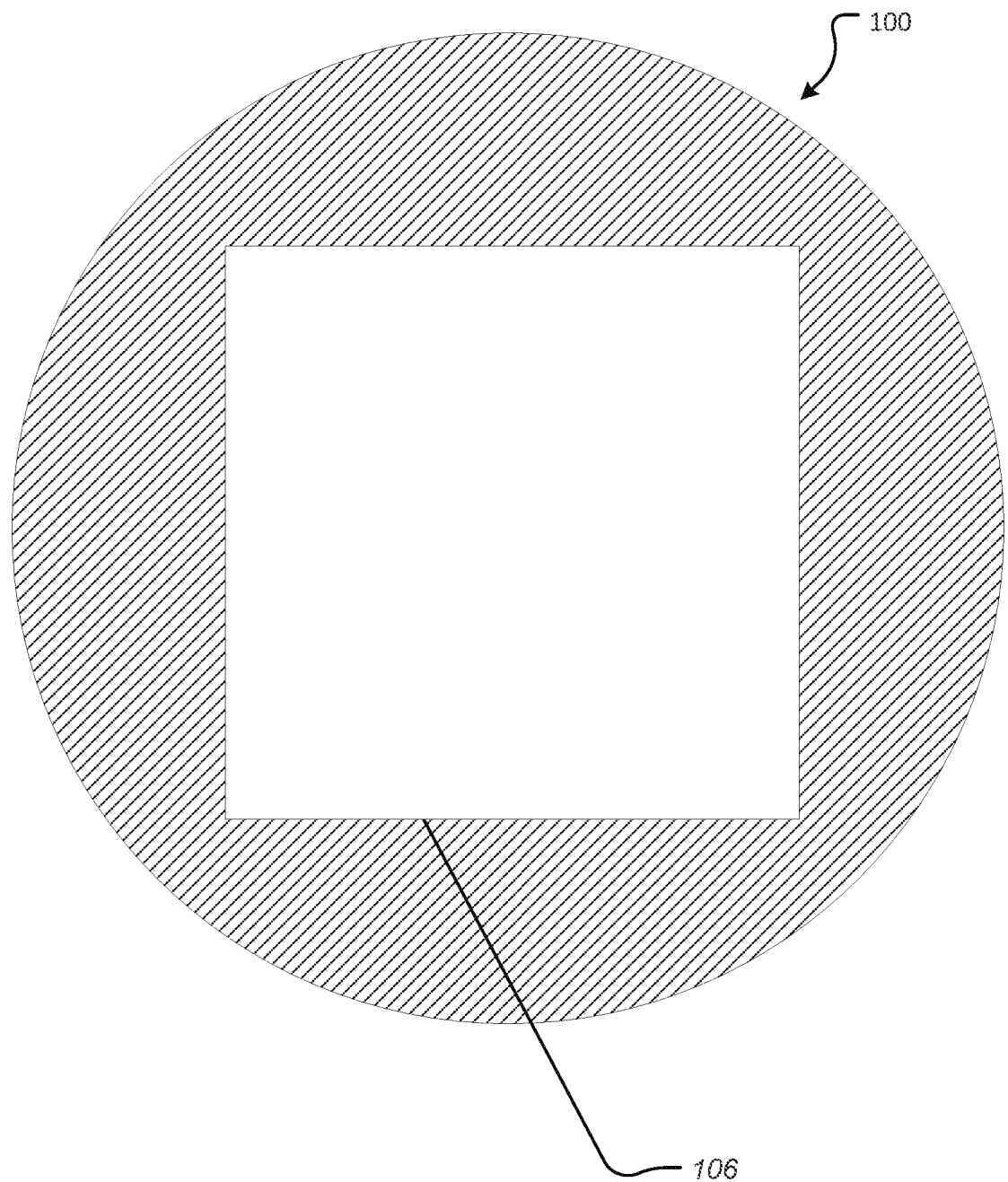
FIG. 20 illustrates a front view of another dampening member according to the disclosure.

FIG. 20 illustrates a front view of another dampening member according to the disclosure. In particular, FIG. 20 illustrates an aspect of the dampening member 100 having a polygonal or square shaped implementation of the inner surface 106. The various other aspects of the hold open rod system 10 described above may be utilized in this particular aspect of the dampening member 100.

Figure 21:
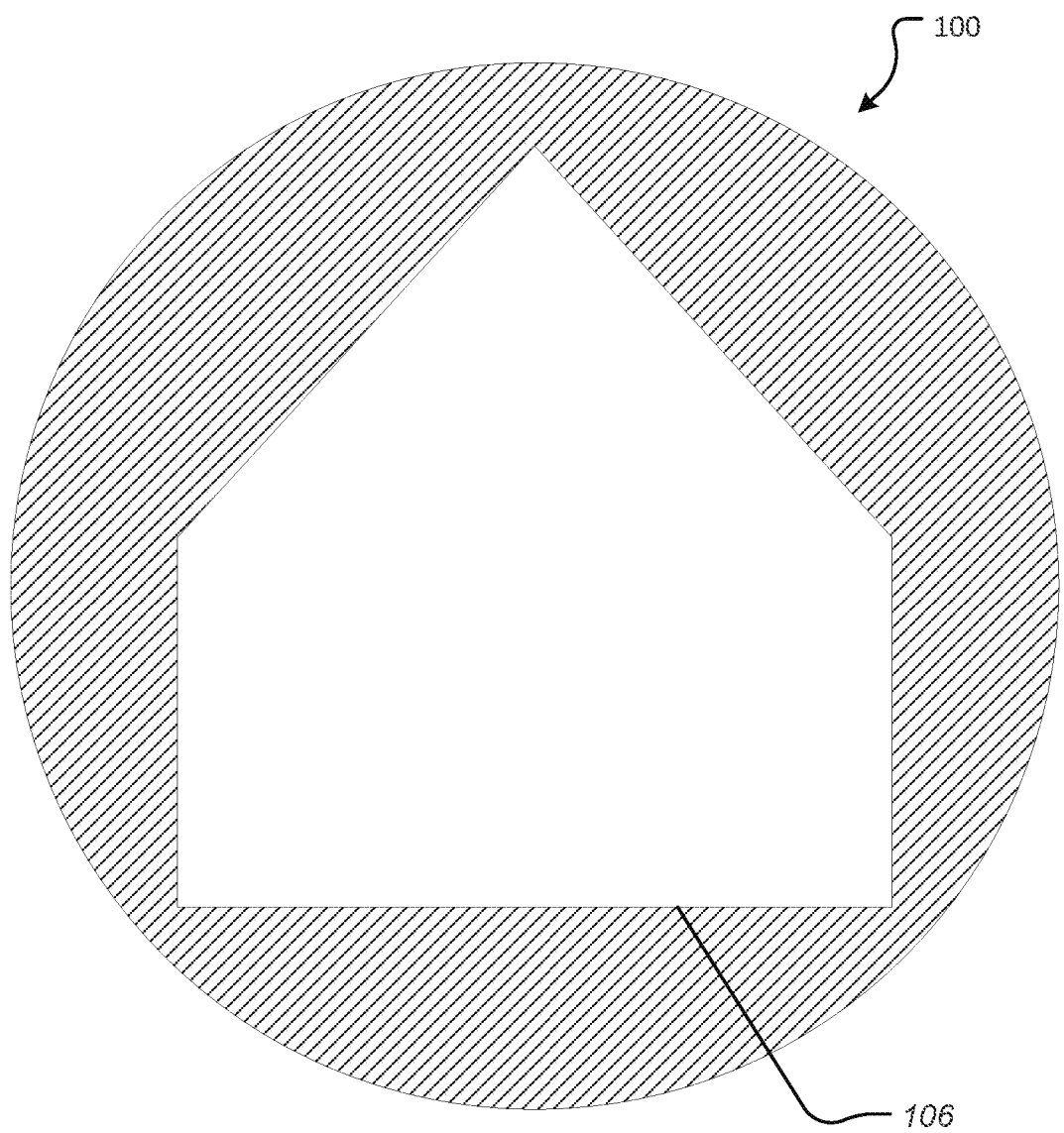
FIG. 21 illustrates a front view of another dampening member according to the disclosure.

FIG. 21 illustrates a front view of another dampening member according to the disclosure. In particular, FIG. 21 illustrates an aspect of the dampening member 100 having a polygonal shaped implementation of the inner surface 106. The various other aspects of the hold open rod system 10 described above may be utilized in this particular aspect of the dampening member 100.

Figure 22:
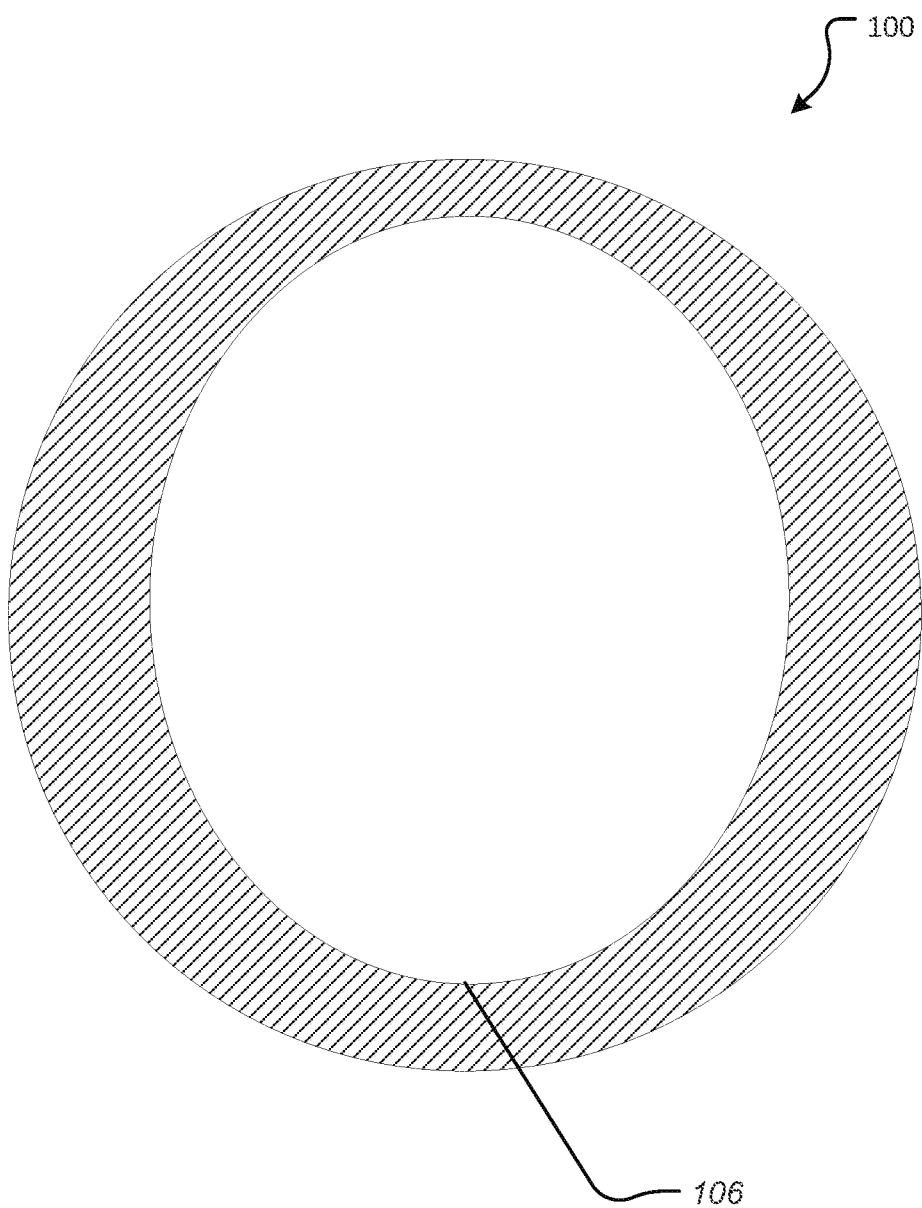
FIG. 22 illustrates a front view of another dampening member according to the disclosure.

FIG. 22 illustrates a front view of another dampening member according to the disclosure. In particular, FIG. 22 illustrates an aspect of the dampening member 100 having an oval shaped implementation of the inner surface 106. The various other aspects of the hold open rod system 10 described above may be utilized in this particular aspect of the dampening member 100.

Figure 23:
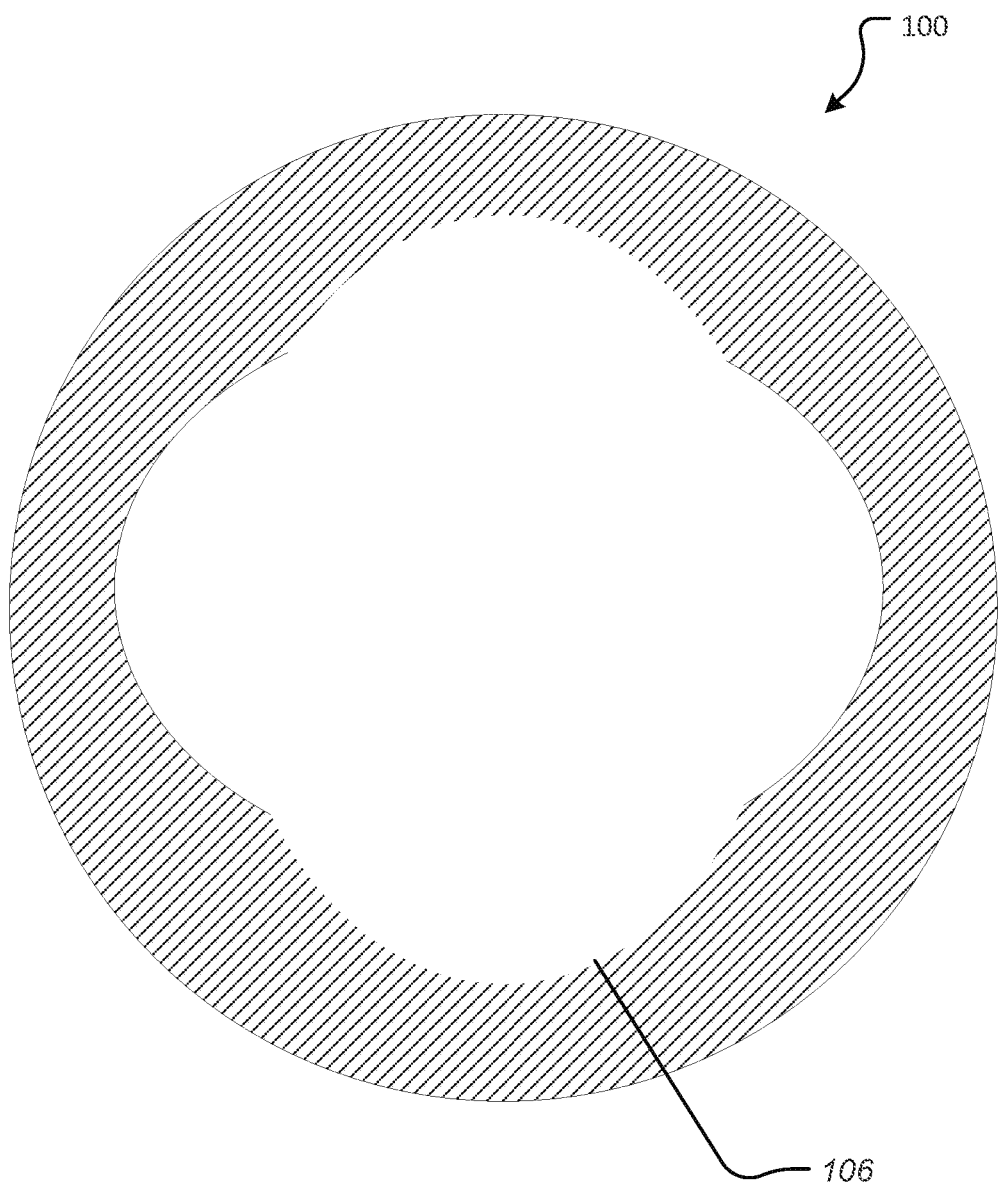
FIG. 23 illustrates a front view of another dampening member according to the disclosure.

FIG. 23 illustrates a front view of another dampening member according to the disclosure. In particular, FIG. 23 illustrates an aspect of the dampening member 100 having a multi-oval shaped implementation of the inner surface 106. The various other aspects of the hold open rod system 10 described above may be utilized in this particular aspect of the dampening member 100.

Figure 24:
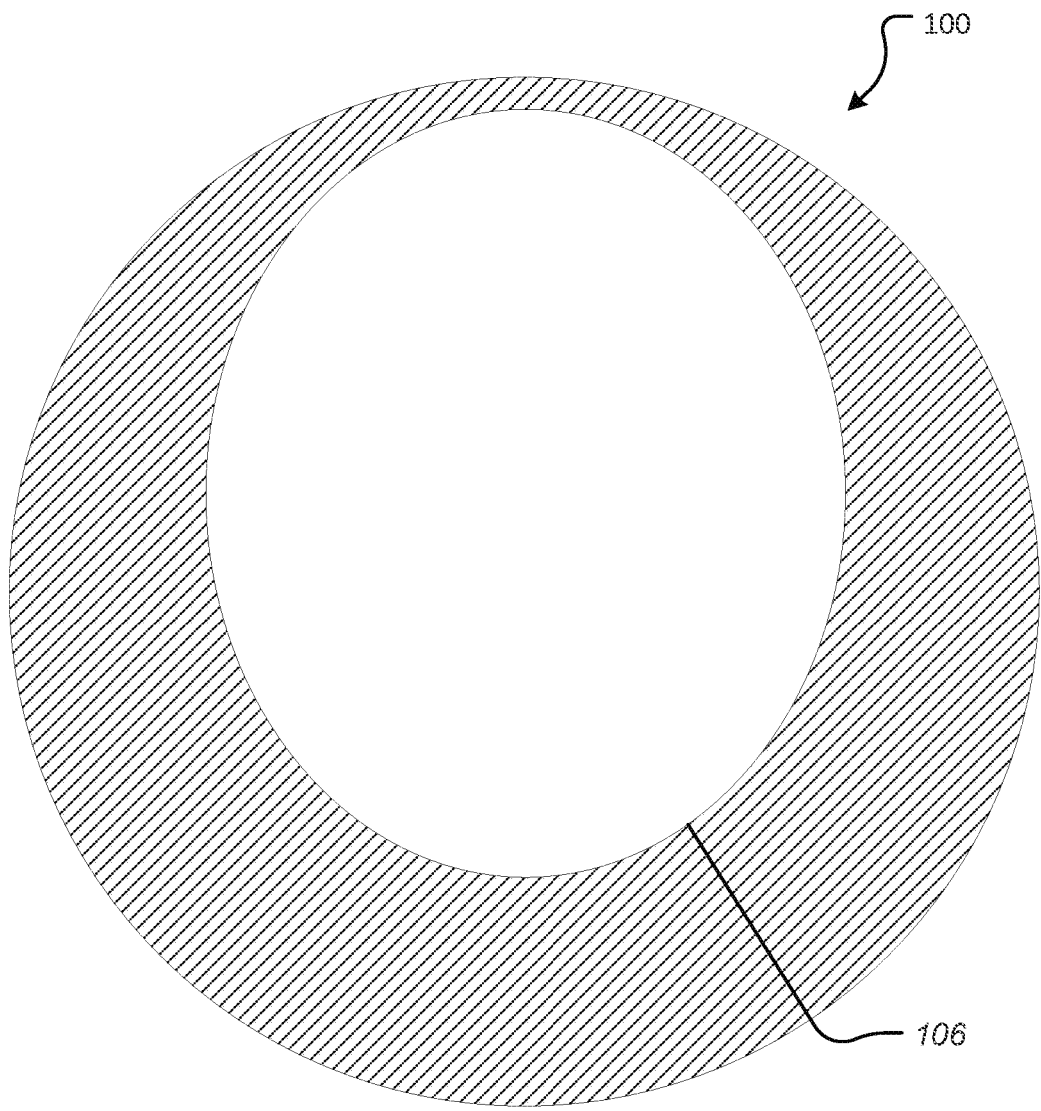
FIG. 24 illustrates a front view of another dampening member according to the disclosure.

FIG. 24 illustrates a front view of another dampening member according to the disclosure. In particular, FIG. 24 illustrates an aspect of the dampening member 100 having an off axis oval shaped implementation of the inner surface 106. The various other aspects of the hold open rod system 10 described above may be utilized in this particular aspect of the dampening member 100.

Figure 25:
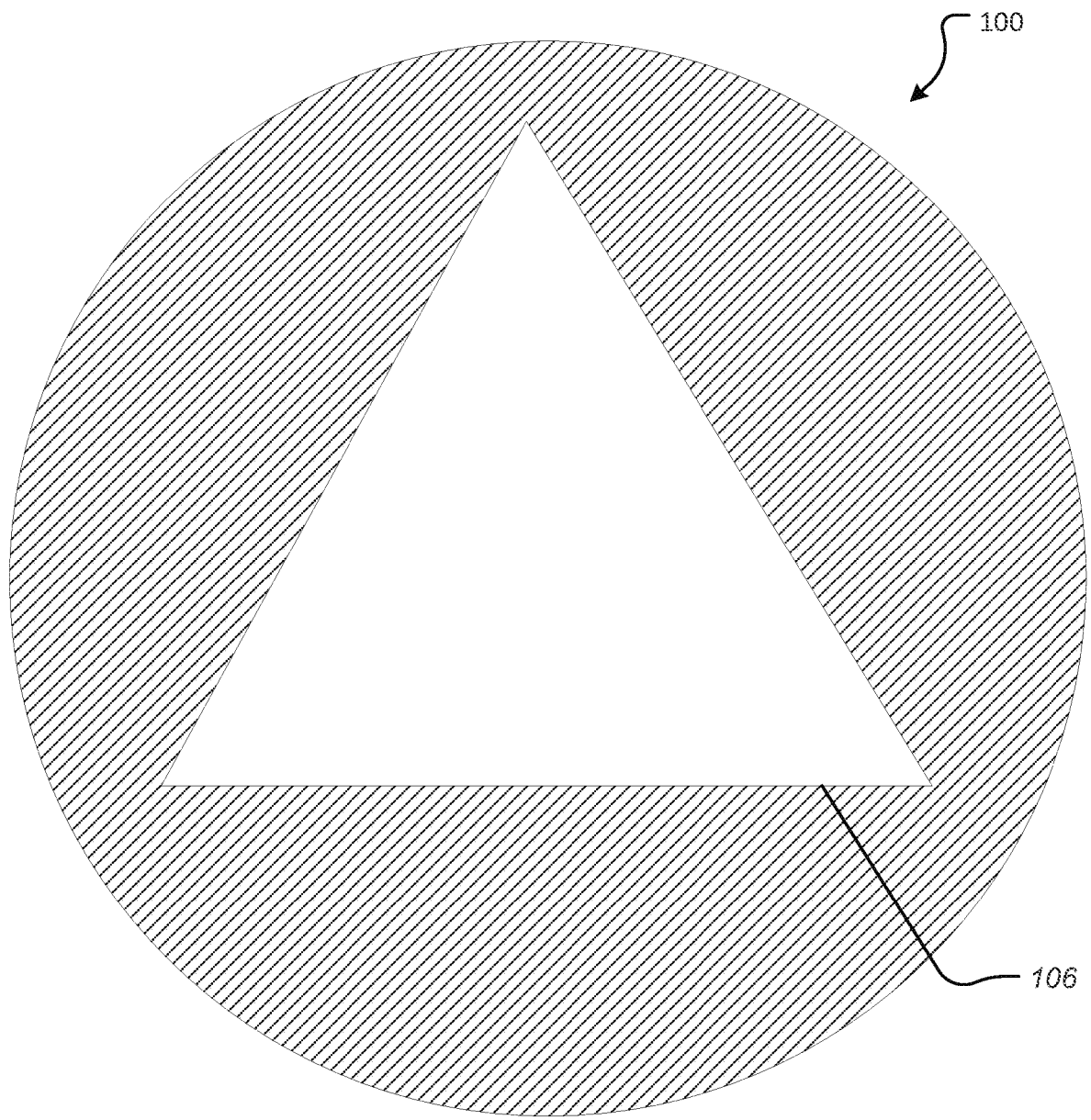
FIG. 25 illustrates a front view of another dampening member according to the disclosure.

FIG. 25 illustrates a front view of another dampening member according to the disclosure. In particular, FIG. 25 illustrates an aspect of the dampening member 100 having triangle shaped implementation of the inner surface 106. The various other aspects of the hold open rod system 10 described above may be utilized in this particular aspect of the dampening member 100.

Figure 26:
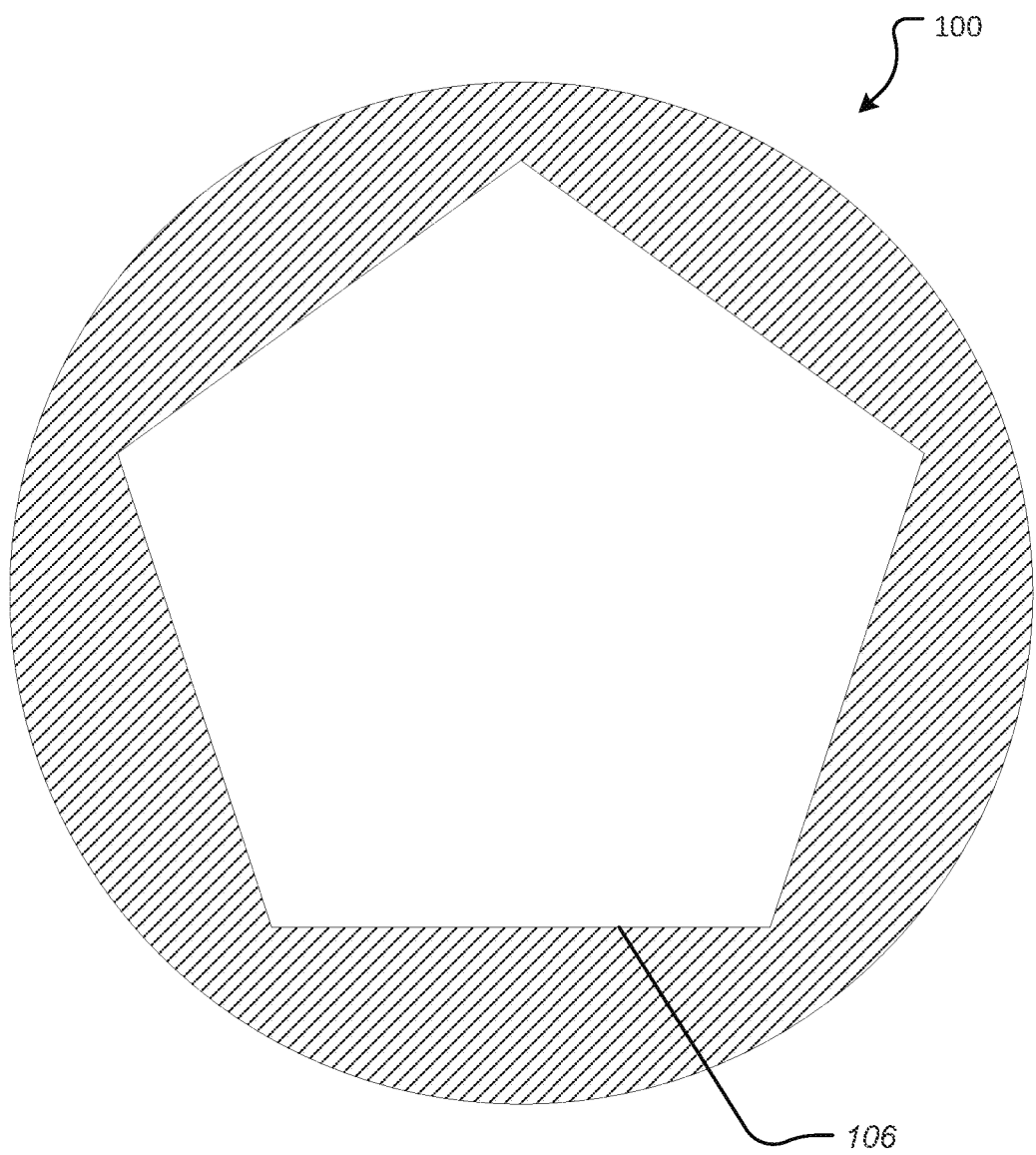
FIG. 26 illustrates a front view of another dampening member according to the disclosure.

FIG. 26 illustrates a front view of another dampening member according to the disclosure. In particular, FIG. 26 illustrates an aspect of the dampening member 100 having a pentagonal shaped implementation of the inner surface 106. The various other aspects of the hold open rod system 10 described above may be utilized in this particular aspect of the dampening member 100.

In accordance with the disclosure, the hold open rod system 10 may have a rattle space or area of movement where one rod of the hold open rod system 10 vibrates with respect to the other rod of the dampening member 100. The dampening member 100 prevents or reduces undesired dynamic instability. The dampening member 100 may be located at an end of a tube at the tube stop 24. The dampening member 100 may have a cylindrical inside diameter. The dampening member 100 may be configured to rotate about the end of the tube at the tube stop 24. This provides additional intentional dynamic instability that may dampen vibration and/or reduce vibration. Finally, the dampening member 100 may change the natural frequency of the associated vibration of the hold open rod system 10 resulting in a dampening of the vibration. This increased dampening is in an unexpected result. Moreover, this dampening is markedly much better, much greater, then prior art circular implementations of dampening members. This increased dampening may reduce failures of the hold open rod system 10, may reduce maintenance of the hold open rod system 10, may allow the hold open rod system 10 to be manufactured utilizing less robust components, less costly components, and the like.

The hold open rod system 10 and/or the locking mechanism 18 may be implemented a number of different ways.

In one aspect, the hold open rod system 10 and/or the locking mechanism 18 may be implemented consistent with U.S. patent application Ser. No. 14/663,227 filed Mar. 19, 2015 (title—"Pull Then Lift Lock Mechanism") owned by the assignee of the disclosure and incorporated by reference herein in its entirety.

In one aspect, the hold open rod system 10 and/or the locking mechanism 18 may be implemented consistent with U.S. patent application Ser. No. 12/857,947 filed Aug. 17, 2010 (title—"Mechanically Dampening Hold Open Rod") owned by the assignee of the disclosure and incorporated by reference herein in its entirety.

In one aspect, the hold open rod system 10 and/or the locking mechanism 18 may be implemented consistent with U.S. patent application Ser. No. 13/323,355, filed Dec. 12, 2011 (title—"Carbon Fiber Hold Open Rod") owned by the assignee of the disclosure and incorporated by reference herein in its entirety.

In one aspect, the hold open rod system 10 and/or the locking mechanism 18 may be implemented consistent with U.S. patent application Ser. No. 13/314,982, filed Dec. 8, 2011 (title—"Reinforced Plastic Locking Dogs") owned by the assignee of the disclosure and incorporated by reference herein in its entirety.

In one aspect, the hold open rod system 10 and/or the locking mechanism 18 may be implemented consistent with U.S. patent application Ser. No. 13/397,320, filed Feb. 15, 2012 (title—"Hold Open Rod Vibration Dampening System") owned by the assignee of the disclosure and incorporated by reference herein in its entirety.

In one aspect, the hold open rod system 10 and/or the locking mechanism 18 may be implemented consistent with U.S. patent application Ser. No. 13/345,239, filed Jan. 6, 2012 (title—"Internal Locking Mechanism For A Hold Open Rod") owned by the assignee of the disclosure and incorporated by reference herein in its entirety.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure,

What is claimed is:

1. A hold open rod comprising:
an inner member;
an outer member configured to have the inner member slide in and out of the outer member; and
a noncircular dampening member arranged on the inner member, the non-circular dampening member comprising an inner surface that forms a cylindrical aperture that extends through the noncircular dampening member, the noncircular dampening member being configured to dampen movement and vibration of at least one of the following: the inner member and the outer member,
wherein the inner surface that forms the cylindrical aperture is configured and sized such that the noncircular dampening member is configured to rotate about the inner member; wherein the noncircular dampening member comprises a three-lobed shaped member having an outer surface with three flat portions and three lobe portions;
wherein the noncircular dampening member is configured to rotate about the inner member and change an orientation of the noncircular dampening member with respect to the inner member to change an axis of vibration of the noncircular dampening member; and
wherein the noncircular dampening member is configured to provide additional intentional dynamic instability to dampen movement and vibration of at least one of the following: the inner member and the outer member.

2. The hold open rod of claim 1, further comprising a locking mechanism configured to selectively lock the inner member and the outer member with respect to each other,
wherein the inner member, the outer member, and the noncircular dampening member are configured such that there is a first space between the non-circular dampening member and the outer member to allow the inner member and the noncircular dampening member to move and/or vibrate within the outer member; and
wherein the inner member, the outer member, and the noncircular dampening member are configured such that there is a second space between the non-circular dampening member and the inner member to allow the inner member and the noncircular dampening member to move and/or vibrate within the outer member.

3. The hold open rod of claim 1,
wherein the inner member comprises a diameter and the inner member comprises a reduced diameter portion, the reduced diameter portion having a diameter smaller than the diameter of the inner member, and the non-circular dampening member is arranged on the reduced diameter portion of the inner member; and
wherein the noncircular dampening member is configured to rotate about the reduced diameter portion and change an orientation of the noncircular dampening member with respect to the reduced diameter portion.

4. The hold open rod of claim 1, wherein the inner member comprises a diameter and the inner member comprises a reduced diameter portion, the reduced diameter portion of the inner member having a diameter smaller than the diameter of the inner member, and the noncircular dampening member is arranged on the reduced diameter portion of the inner member.

5. The hold open rod of claim 1, comprising a fastener for attaching the hold open rod to a door or hatch,
wherein the inner member, the outer member, and the noncircular dampening member are configured such that there is a space between the noncircular dampening member and the outer member to allow the inner member and the non-circular dampening member to move and/or vibrate within the outer member.

6. The hold open rod of claim 1, wherein the hold open rod is attached to an aircraft.

7. The hold open rod of claim 1
wherein the noncircular dampening member comprises a polyamideimide material and/or a glass fiber composite material;
wherein the three flat portions of the noncircular dampening member are each configured with a flat surface; and
wherein adjacent flat surfaces of the noncircular dampening member form an angle of 60°.

8. The hold open rod of claim 1
wherein the noncircular dampening member comprises end portions located on opposing sides of the noncircular dampening member;
wherein the end portions form a flat surface;
wherein the three flat portions of the noncircular dampening member are each configured with a flat surface; and
wherein adjacent flat surfaces of the noncircular dampening member form an angle of 60°.

9. A hold open rod comprising:
an inner member;
an outer member configured to have the inner member slide in and out of the outer member; and
a noncircular dampening member arranged on the inner member, the non-circular dampening member comprising an inner surface that forms a cylindrical aperture that extends through the noncircular dampening member, the noncircular dampening member being configured to dampen movement and vibration of at least one of the following: the inner member and the outer member,
wherein the inner surface that forms the cylindrical aperture is configured and sized such that the noncircular dampening member is configured to rotate about the inner member;
wherein the noncircular dampening member comprises a three-lobed shaped member having an outer surface with three flat portions and three lobe portions;
wherein the inner member, the outer member, and the noncircular dampening member are configured such that there is a first space between the non-circular dampening member and the outer member to allow the inner member and the noncircular dampening member to move and/or vibrate within the outer member; and
wherein the inner member, the outer member, and the noncircular dampening member are configured such that there is a second space between the non-circular dampening member and the inner member to allow the inner member and the noncircular dampening member to move and/or vibrate within the outer member.

10. The hold open rod of claim 9
wherein the noncircular dampening member is configured to rotate about the inner member and change an orientation of the noncircular dampening member with respect to the inner member to change an axis of vibration of the noncircular dampening member; and
wherein the noncircular dampening member is configured to provide additional intentional dynamic instability to dampen movement and vibration of at least one of the following: the inner member and the outer member.

11. A hold open rod comprising:
an inner member;
an outer member configured to have the inner member located at least partially within the outer member; and
a noncircular dampening member within the outer member, the non-circular dampening member comprising an inner surface that forms a cylindrical aperture that extends through the noncircular dampening member, the noncircular dampening member being configured to dampen movement and vibration of at least one of the following: the inner member and the outer member,
wherein the inner surface that forms the cylindrical aperture is configured and sized such that the noncircular dampening member is configured to rotate about the inner member; and
wherein the noncircular dampening member comprises a three-lobed shaped member having an outer surface with three flat portions and three lobe portions;
wherein the inner member, the outer member, and the noncircular dampening member are configured such that there is a first space between the non-circular dampening member and the outer member to allow the inner member and the noncircular dampening member to move and/or vibrate within the outer member; and
wherein the inner member, the outer member, and the noncircular dampening member are configured such that there is a second space between the non-circular dampening member and the inner member to allow the inner member and the noncircular dampening member to move and/or vibrate within the outer member.

12. The hold open rod of claim 11, further comprising a locking mechanism configured to selectively lock the inner member and the outer member with respect to each other.

13. The hold open rod of claim 11,
wherein the inner member comprises a diameter and the inner member comprises a reduced diameter portion, the reduced diameter portion having a diameter smaller than the diameter of the inner member, and the noncircular dampening member is arranged on the reduced diameter portion of the inner member; and
wherein the noncircular dampening member is configured to rotate about the reduced diameter portion and change an orientation of the noncircular dampening member with respect to the reduced diameter portion.

14. The hold open rod of claim 11, wherein the inner member comprises a diameter and the inner member comprises a reduced diameter portion, the reduced diameter portion of the inner member having a diameter smaller than the diameter of the inner member, and the noncircular dampening member is arranged on the reduced diameter portion of the inner member.

15. The hold open rod of claim 11, wherein:
the inner member comprises a diameter and a reduced diameter portion, the reduced diameter portion having a diameter smaller than the diameter, and the noncircular dampening member is arranged on the reduced diameter portion.

16. The hold open rod of claim 11, comprising a fastener for attaching the hold open rod to a door or hatch,
wherein the inner member, the outer member, and the noncircular dampening member are configured such that there is a space between the noncircular dampening member and the outer member to allow the inner member and the non-circular dampening member to move and/or vibrate within the outer member.

17. The hold open rod of claim 11
wherein the noncircular dampening member is configured to rotate about the inner member and change an orientation of the noncircular dampening member with respect to the inner member to change an axis of vibration of the noncircular dampening member; and
wherein the noncircular dampening member is configured to provide additional intentional dynamic instability to dampen movement and vibration of at least one of the following: the inner member and the outer member.

18. The hold open rod of claim 11
wherein the noncircular dampening member comprises a polyamideimide material and/or a glass fiber composite material;
wherein the three flat portions of the noncircular dampening member are each configured with a flat surface; and
wherein adjacent flat surfaces of the noncircular dampening member form an angle of 60°.

19. The hold open rod of claim 11
wherein the noncircular dampening member comprises end portions located on opposing sides of the noncircular dampening member;
wherein the end portions form a flat surface;
wherein the three flat portions of the noncircular dampening member are each configured with a flat surface; and
wherein adjacent flat surfaces of the noncircular dampening member form an angle of 60°.

* * * * *